US009832474B2

(12) United States Patent
Kim et al.

(10) Patent No.: US 9,832,474 B2
(45) Date of Patent: *Nov. 28, 2017

(54) METHOD AND APPARATUS FOR SETTING REFERENCE PICTURE INDEX OF TEMPORAL MERGING CANDIDATE

(71) Applicants: Electronics and Telecommunications Research Institute, Daejeon (KR); University-Industry Cooperation Group of Kyung Hee University, Yongin-si (KR)

(72) Inventors: Hui Yong Kim, Daejeon (KR); Gwang Hoon Park, Seongnam-si (KR); Kyung Yong Kim, Suwon-si (KR); Sang Min Kim, Yongin-si (KR); Sung Chang Lim, Daejeon (KR); Jin Ho Lee, Daejeon (KR); Jin Soo Choi, Daejeon (KR); Jin Woong Kim, Wonju-si (KR)

(73) Assignees: ELECTRONICS AND TELECOMMUNICATIONS RESEARCH INSTITUTE, Daejeon (KR); University-Industry Cooperation Group of Kyung Hee University, Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/584,474

(22) Filed: May 2, 2017

(65) Prior Publication Data

US 2017/0237993 A1  Aug. 17, 2017

Related U.S. Application Data

(63) Continuation of application No. 15/408,695, filed on Jan. 18, 2017, which is a continuation of application
(Continued)

(30) Foreign Application Priority Data

Dec. 23, 2011  (KR) .................. 10-2011-0140861
Jan. 11, 2012  (KR) .................. 10-2012-0003617
Dec. 18, 2012  (KR) .................. 10-2012-0147996

(51) Int. Cl.
*H04N 19/176* (2014.01)
*H04N 19/103* (2014.01)
(Continued)

(52) U.S. Cl.
CPC ......... *H04N 19/176* (2014.11); *H04N 19/103* (2014.11); *H04N 19/139* (2014.11); *H04N 19/513* (2014.11); *H04N 19/124* (2014.11)

(58) Field of Classification Search
CPC ........... H04N 19/00575; H04N 19/105; H04N 19/136; H04N 19/176
See application file for complete search history.

(56) References Cited

U.S. PATENT DOCUMENTS

2004/0066848 A1  4/2004  Jeon
2012/0134416 A1  5/2012  Lin et al.
2012/0189062 A1*  7/2012  Sugio .................. H04N 19/176
375/240.16

FOREIGN PATENT DOCUMENTS

CN  101965733 A  2/2011
KR  10-2009-0096659 A  9/2009
(Continued)

OTHER PUBLICATIONS

Jeon, Y. et al., "Non-CE9: simplification of merge/skip TMVP ref_idx derivation", 7th meeting of the Joint Collaborative Team on Video Coding (JCT-VC) of ITU-T SG16 WP3 and ISO/IEC JTC1/SC29/WG11, held on Nov. 19-30, 2011 in Geneva, CH, Document: JCTVC-G163 (9 pages).
(Continued)

*Primary Examiner* — Peter D Le
(74) *Attorney, Agent, or Firm* — NSIP Law

(57) ABSTRACT

The present invention relates to a method and apparatus for setting a reference picture index of a temporal merging candidate. An inter-picture prediction method using a temporal merging candidate can include the steps of: determining a reference picture index for a current block; and inducing a temporal merging candidate block of the current block and calculating a temporal merging candidate from the temporal merging candidate block, wherein the reference picture index of the temporal merging candidate can be calculated regardless of whether a block other than the current block is decoded. Accordingly, a video processing speed can be increased and video processing complexity can be reduced.

7 Claims, 16 Drawing Sheets

Related U.S. Application Data

No. 14/354,819, filed as application No. PCT/KR2012/011059 on Dec. 18, 2012, now Pat. No. 9,596,466.

(51) Int. Cl.
*H04N 19/513* (2014.01)
*H04N 19/139* (2014.01)
*H04N 19/124* (2014.01)

(56) References Cited

FOREIGN PATENT DOCUMENTS

| KR | 10-2011-0067648 A | 6/2011 |
| KR | 10-2011-0068897 A | 6/2011 |
| WO | WO 2011/074896 A2 | 6/2011 |
| WO | WO 2011/126349 A2 | 10/2011 |
| WO | WO 2011/155758 A2 | 12/2011 |

OTHER PUBLICATIONS

Kim I. et al., "Reduction of reference picture list checking for temporal motion vector prediction", $6^{th}$ Meeting of the Joint Collaborative Team on Video Coding (JCT-VC) of ITU-T SG16 WP3 and ISO/IEC JTC1/SC29/WG11, held on Jul. 14-22, 2011 in Torino, IT, Document: JCTVC-F587 (4 pages).

Zhou, M., "Parallelized merge/skip mode for HEVC", $6^{th}$ Meeting of the Joint Collaborative Team on Video Coding (JCT-VC) of ITU-T SG16 WP3 and ISO/IEC JTC1/SC29/WG11, held on Jul. 14-22, 2011 in Torino, IT, Document: JCTVC-F069 (13 pages).

Extended European Search Report dated Aug. 14, 2015 in counterpart European Application No. 12858909.0 (9 pages).

International Search Report dated Mar. 19, 2013 in counterpart International Application No. PCT/KR2012/011059. (5 pages including English translation).

Kim, I. et al., "Restriction on Motion Vector Scaling for Merge and AMVP," 7th Meeting of Joint.Collaborative Team on Video Coding (JCT-VC) of ITU-T SG16 WP3 and ISO/IEC JTC1/SC29/WG11 held on Nov. 21-30 in Geneva, CH (4 pages).

\* cited by examiner (A)

(B)

(A)

(B)

(A)

(B)

(A)

(B)

(A)

(B)

(A)

(B)

(A) Nx2N      (B) 2NxN (A)

(B)

(A)

(B)

METHOD AND APPARATUS FOR SETTING REFERENCE PICTURE INDEX OF TEMPORAL MERGING CANDIDATE

CROSS-REFERENCE TO RELATED APPLICATIONS

This application is a continuation of U.S. application Ser. No. 15/408,695 filed on Jan. 18, 2017, which is a continuation of U.S. application Ser. No. 14/354,819 filed on Apr. 28, 2014, which claims the benefit of National Stage application of International Application No. PCT/KR2012/011059, filed on Dec. 18, 2012, which claims the benefit of priority of Korean Patent Application No. 10-2011-0140861 filed on Dec. 23, 2011, Korean Patent Application No. 10-2012-0003617 filed on Jan. 11, 2012, and Korean Patent Application No. 10-2012-0147996 filed on Dec. 18, 2012, the entire disclosures of which are incorporated herein by reference for all purposes.

BACKGROUND OF THE INVENTION

Field of the Invention

The present invention relates to an image processing method and apparatus and, more particularly, to an inter-frame prediction method and an apparatus using the method.

Related Art

A demand for images having high resolution and high quality, such as a High Definition (HD) image and an Ultra High Definition (UHD) image, is recently increasing in a variety of application fields. As the resolution and quality of image data become higher, the amount of the image data becomes relatively greater than that of the existing image data. For this reason, if the image data is transmitted using media, such as the existing wired/wireless broadband lines, or the image data is stored by using the existing storage medium, a transmission cost and a storage cost are increased. Image compression techniques with high efficiency can be used to solve the problems occurring as the resolution and quality of image data becomes higher.

Image compression techniques include a variety of techniques, such as an inter-frame prediction technique for predicting a pixel value included in a current picture from a picture anterior or posterior to the current picture, an intra-frame prediction technique for predicting a pixel value included in a current picture by using information on a pixel within the current picture, and an entropy coding technique for allocating a short symbol to a value having high frequency of appearance and allocating a long symbol to a value having low frequency of appearance. Image data can be effectively compressed, transmitted, or stored by using the image compression techniques.

SUMMARY OF THE INVENTION

An object of the present invention is to provide a method of setting the reference picture index of a temporal merging candidate.

Another object of the present invention is to provide an apparatus for performing a method of setting the reference picture index of a temporal merging candidate.

In accordance with an aspect of the present invention, an inter-frame prediction method using a temporal merging candidate may include the steps of determining the reference picture index of the temporal merging candidate for a current block and deriving the temporal merging candidate block of the current block and deriving the temporal merging candidate from the temporal merging candidate block, wherein the reference picture index of the temporal merging candidate can be derived irrespective of whether other blocks except the current block have been decoded or not. The temporal merging candidate may be derived in a unit of a coding block including the current block or in a unit of the current block depending on whether the current block will use a single merging candidate list or not. The inter-frame prediction method may further include the step of determining whether or not the current block is a block using the single merging candidate list, wherein the single merging candidate list may derive and generate at least one of the spatial merging candidate and the temporal merging candidate of a prediction block based on a coding block including the prediction block. The step of determining whether or not the current block is a block using the single merging candidate list may include the steps of decoding information on the size of the current block and determining whether or not the information on the size of the current block satisfies conditions of the size of a block that the single merging candidate list is derived. The reference picture index of the temporal merging candidate may be set to a fixed value. The temporal merging candidate may include a temporal motion vector calculated by comparing a difference between the reference picture index of a temporal merging candidate block (i.e., a colocated block) and the index of a picture (i.e., a colocated picture) including the colocated block with a difference between the reference picture index of the temporal merging candidate having the index of the fixed value and the index of the picture including the current block. The reference picture index of the temporal merging candidate may be set to 0.

In accordance with another aspect of the present invention, a decoder for performing an inter-frame prediction method using a temporal merging candidate includes a merging candidate deriving unit configured to determine the reference picture index of the temporal merging candidate for a current block, derive the temporal merging candidate block of the current block, and derive a temporal merging candidate from the temporal merging candidate block, wherein the reference picture index of the temporal merging candidate may be derived irrespective of whether other blocks except the current block have been decoded or not. The temporal merging candidate may be derived in a unit of a coding block including the current block or in a unit of the current block depending on whether the current block will use a single merging candidate list or not. The merging candidate deriving unit may be configured to determine whether or not the current block is a block using the single merging candidate list, and the single merging candidate list may derive and generate at least one of the spatial merging candidate and the temporal merging candidate of a prediction block based on a coding block including the prediction block. The merging candidate deriving unit may be configured to decode information on the size of the current block and determine whether or not the information on the size of the current block satisfies conditions of the size of a block that the single merging candidate list is derived, in order to determine whether or not the current block is a block using the single merging candidate list. The reference picture index of the temporal merging candidate may be set to a fixed value. The temporal merging candidate may include a temporal motion vector calculated by comparing a difference between the reference picture index of a temporal merging candidate block (a colocated block) and the index of a picture (a colocated picture) including the colocated block with a difference between the reference picture index of the temporal merging candidate having the index of the fixed value and the index of the picture including the current block. The reference picture index of the temporal merging candidate may be set to 0.

As described above, in accordance with the method and apparatus for setting the reference picture index of a temporal merging candidate according to embodiments of the present invention, inter-frame prediction using a temporal merging candidate can be performed on a plurality of prediction blocks in parallel by using a temporal merging candidate set to a specific value or using the reference picture index of a spatial merging candidate at a predetermined location as the reference picture index of a temporal merging candidate. Accordingly, an image processing speed can be increased, and the complexity of image processing can be reduced.

DESCRIPTION OF EXEMPLARY EMBODIMENTS

Hereinafter, exemplary embodiments are described in detail with reference to the accompanying drawings. In describing the embodiments of the present invention, a detailed description of the known functions and constructions will be omitted if it is deemed to make the gist of the present invention unnecessarily vague.

When it is said that one element is "connected" or "coupled" to the other element, the one element may be directly connected or coupled to the other element, but it should be understood that a third element may exist between the two elements. Furthermore, in the present invention, the contents describing that a specific element is "included (or comprised)" does not mean that elements other than the specific element are excluded, but means that additional elements may be included in the implementation of the present invention or in the scope of technical spirit of the present invention.

Terms, such as the first and the second, may be used to describe various elements, but the elements should not be restricted by the terms. The terms are used to only distinguish one element and the other element from each other. For example, a first element may be named a second element without departing from the scope of the present invention. Likewise, a second element may also be named a first element.

Furthermore, elements described in the embodiments of the present invention are independently shown in order to indicate different and characteristic functions, and it does not mean that each of the elements consists of separate hardware or a piece of software unit. That is, the elements are arranged, for convenience of description, and at least two of the elements may be combined to form one element or one element may be divided into a plurality of elements and the plurality of elements may perform functions. An embodiment in which the elements are combined or each of the elements is divided is included in the scope of the present invention without departing from the essence of the present invention.

Furthermore, in the present invention, some elements may not be essential elements for performing essential functions, but may be optional elements for improving only performance. The present invention may be implemented using only the essential elements for implementing the essence of the present invention other than the elements used to improve only performance, and a structure including only the essential elements other than the optional elements used to improve only performance are included in the scope of the present invention.

Figure 1:
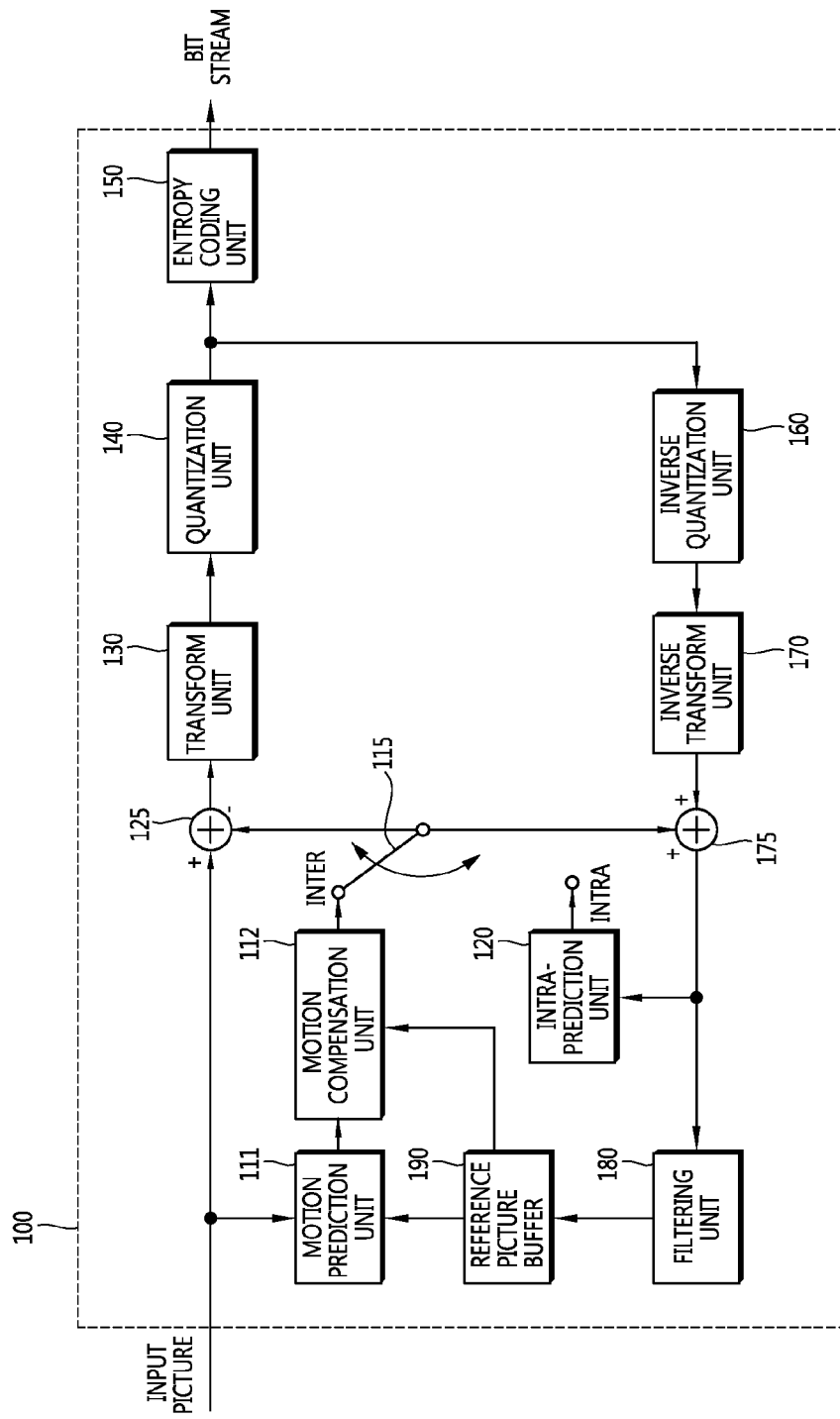
FIG. 1 is a block diagram showing the construction of an image coder in accordance with an embodiment of the present invention.

FIG. 1 is a block diagram showing the construction of an image coder in accordance with an embodiment of the present invention.

Referring to FIG. 1, the image coder 100 includes a motion prediction unit 111, a motion compensation unit 112, an intra-prediction unit 120, a switch 115, a subtractor 125, a transform unit 130, a quantization unit 140, an entropy coding unit 150, an inverse quantization unit 160, an inverse transform unit 170, an adder 175, a filtering unit 180, and a reference picture buffer 190.

The image coder 100 can perform coding an input picture in intra mode or inter mode and output a bit stream. The switch 115 can switch to intra mode in the case of intra mode and can switch to inter mode in the case of inter mode. The image coder 100 can derive a prediction block for the input block of the input picture and then code the residual of the input block and the prediction block.

Intra mode can be defined and used as a term 'intra-frame prediction mode', inter mode can be defined and used as a term 'inter-frame prediction mode', the intra-prediction unit 120 can be defined and used as a term 'intra-frame prediction unit', and the motion prediction unit 111 and the motion compensation unit 112 can be defined and used as a term 'inter-frame prediction unit'.

An inter-frame prediction method in accordance with an embodiment of the present invention discloses a method of determining the reference picture index of a temporal merging candidate. The intra-prediction unit 120 can include a merging candidate deriving unit for deriving the spatial merging candidate and temporal merging candidate blocks of a current block and deriving a spatial merging symbol from the spatial merging candidate block and a temporal merging candidate from the temporal merging candidate block. A method of deriving the merging candidates will be described in detail later.

In the case of intra mode, the intra-prediction unit 120 can derive the prediction block by performing spatial prediction by using the pixel value of an already coded block near a current block.

In the case of inter mode, the motion prediction unit 111 can obtain a motion vector by searching a reference picture, stored in the reference picture buffer 190, for a region that is most well matched with the input block in a motion prediction process. The motion compensation unit 112 can derive the prediction block by performing motion compensation using the motion vector.

The subtractor 125 can derive a residual block by way of the residual of the input block and the derived prediction block. The transform unit 130 can output a transform coefficient by performing transform on the residual block. Here, the transform coefficient can mean a coefficient value derived by performing transform on the residual block and/or a residual signal. In the following specification, a quantized transform coefficient level derived by applying quantization to a transform coefficient can also be called a transform coefficient.

The quantization unit 140 can quantize the input transform coefficient according to a quantization parameter and output a quantized transform coefficient level.

The entropy coding unit 150 can perform entropy coding based on values calculated by the quantization unit 140 or a coding parameter value derived in a coding process and output a bit stream based on a result of the entropy coding.

If entropy coding is applied, the size of a bit stream for each of target coding symbols can be reduced because the symbols are represented by allocating a small number of bits to a symbol having a high probability of occurrence and a large number of bits to a symbol having a low probability of occurrence. Accordingly, the compression performance of image coding can be increased by way of the entropy coding. The entropy coding unit 150 can use a coding method, such as exponential golomb, Context-Adaptive Variable Length Coding (CAVLC), or Context-Adaptive Binary Arithmetic Coding (CABAC), for the entropy coding.

In the image coder according to the embodiment of FIG. 1, a currently coded image needs to be decoded and stored in order to be used as a reference picture because inter-prediction coding, that is, inter-frame prediction coding, is performed. Accordingly, the quantized coefficient is inversely quantized by the inverse quantization unit 160 and then inversely transformed by the inverse transform unit 170. The inversely quantized and inversely transformed coefficient is added to the prediction block by way of the adder 175, and thus a reconstructed block is derived.

The reconstructed block experiences the filtering unit 180. The filtering unit 180 can apply one or more of a deblocking filter, a Sample Adaptive Offset (SAO), and an Adaptive Loop Filter (ALF) to the reconstructed block or a reconstructed picture. The reconstructed block that has experienced the filtering unit 180 can be stored in the reference picture buffer 190.

Figure 2:
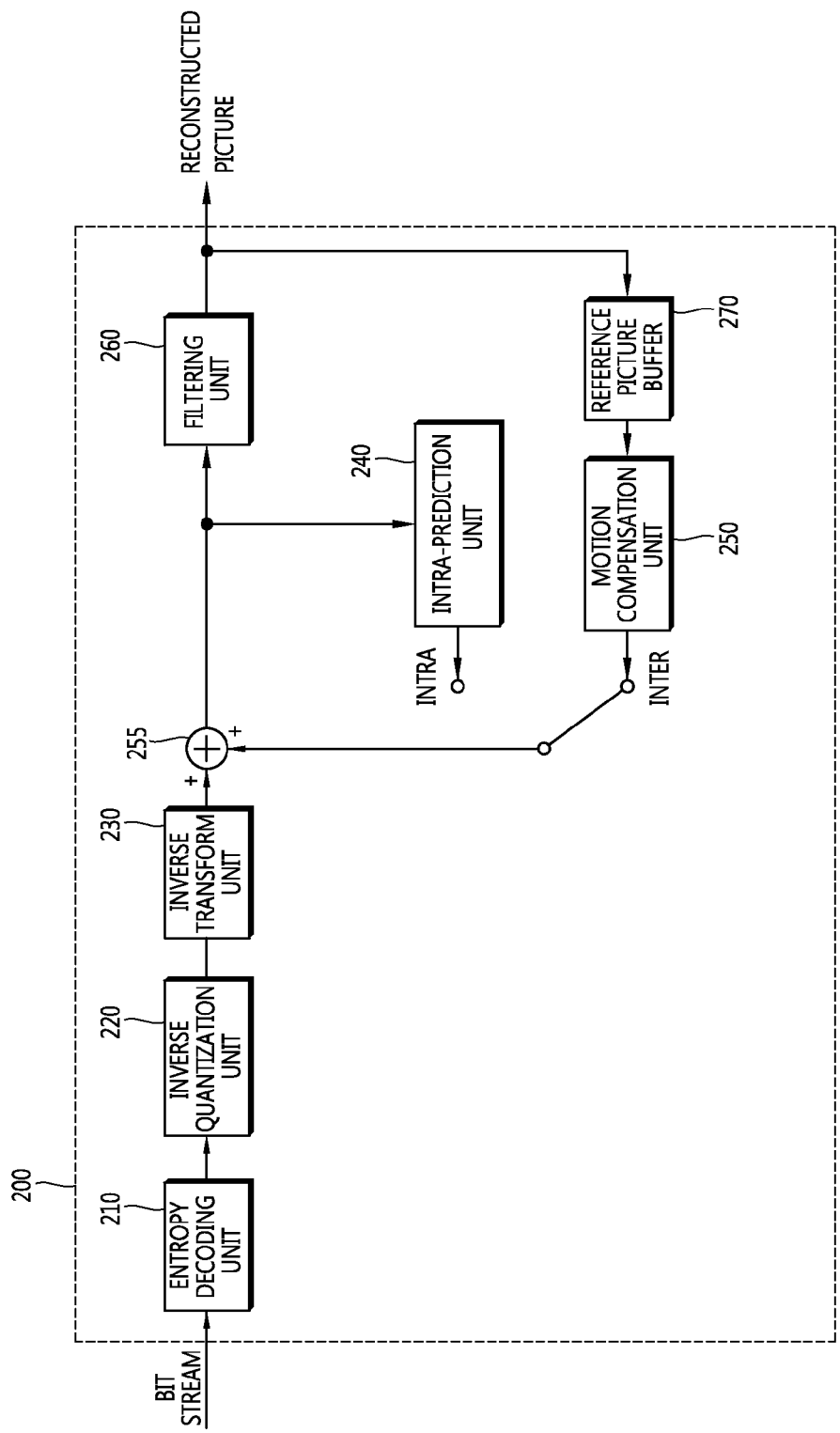
FIG. 2 is a block diagram showing the construction of an image decoder in accordance with another embodiment of the present invention.

FIG. 2 is a block diagram showing the construction of an image decoder in accordance with another embodiment of the present invention.

Referring to FIG. 2, the image decoder 200 includes an entropy decoding unit 210, an inverse quantization unit 220, an inverse transform unit 230, an intra-prediction unit 240, a motion compensation unit 250, an adder 255, a filtering unit 260, and a reference picture buffer 270.

The image decoder 200 can receive a bit stream from a coder, perform decoding on the bit stream in intra mode or inter mode, and output a reconfigured image, that is, a reconstructed picture. A switch can switch to intra mode in the case of intra mode and can switch to inter mode in the case of inter mode. The image decoder 200 can obtain a reconstructed residual block from the input bit stream, derive a prediction block from the reconstructed residual block, and derive a block reconstructed by adding the reconstructed residual block and the prediction block together, that is, the reconstructed block.

The entropy decoding unit 210 can derive symbols, including a symbol having a quantized coefficient form, by performing entropy decoding on the input bit stream according to a probability distribution. The entropy decoding method is similar to the aforementioned entropy coding method.

If the entropy decoding method is applied, the size of a bit stream for each of symbols can be reduced because the symbols are represented by allocating a small number of bits to a symbol having a high probability of occurrence and a large number of bits to a symbol having a low probability of occurrence. Accordingly, the compression performance of image decoding can be increased by the entropy decoding method.

The quantized coefficient is inversely quantized by the inverse quantization unit 220 and then inversely transformed by the inverse transform unit 230. As a result of the inverse quantization and the inverse transform on the quantized coefficient, the reconstructed residual block can be derived.

In the case of intra mode, the intra-prediction unit 240 can derive a prediction block by performing spatial prediction using the pixel value of an already decoded block near a current block. In the case of inter mode, the motion compensation unit 250 can derive the prediction block by performing motion compensation using a motion vector and a reference picture stored in the reference picture buffer 270.

An inter-frame prediction method in accordance with an embodiment of the present invention discloses a method of determining the reference picture index of a temporal merging candidate. An intra-prediction unit can include a merging candidate deriving unit for deriving the spatial merging candidate and temporal merging candidate blocks of a current block and deriving a spatial merging symbol from the spatial merging candidate block and a temporal merging candidate from the temporal merging candidate block. A method of deriving the merging candidates will be additionally described later.

The reconstructed residual block and the prediction block are added by the adder 255, and the added block can experience the filtering unit 260. The filtering unit 260 can apply one or more of a deblocking filter, an SAO, and an ALF to a reconstructed block or a reconstructed picture. The filtering unit 260 can output the reconfigured picture. The reconstructed picture can be stored in the reference picture buffer 270 and used for inter-prediction.

A method of improving the prediction performance of an image coder and an image decoder includes a method of increasing the accuracy of an interpolation image and a method of predicting a difference signal. The difference signal indicates a difference between the original image and a prediction image. In the present invention, a "difference signal" can be replaced with a "residual signal", a "residual block", or a "difference block" depending on context. A person having ordinary skill in the art can distinguish the residual signal, the residual block, and the difference block from each other within a range that does not affect the spirit and essence of the invention.

In an embodiment of the present invention, a term, such as a Coding Unit (CU), a Prediction Unit (PU), or a Transform Unit (TU), can be used as a unit for processing an image.

The CU is an image processing unit on which coding/decoding are performed. The CU can include information used to code or decode a coding block, that is, a block unit set of luminance samples or chrominance samples on which coding/decoding are performed, and the samples of the coding block.

The PU is an image processing unit on which prediction is performed. The PU can include information used to predict a prediction block, that is, a block unit set of luminance samples or chrominance samples on which prediction is performed, and the samples of the prediction block. Here, a coding block can be classified into a plurality of prediction blocks.

The TU is an image processing unit on which transform is performed. The TU can include information used to transform a transform block, that is, a block unit set of luminance samples or chrominance samples on which transform is performed, and the samples of the transform block. Here, a coding block can be classified into a plurality of transform blocks.

In an embodiment of the present invention, a block and a unit can be interpreted as having the same meaning unless described otherwise hereinafter.

Furthermore, a current block can designate a block on which specific image processing is being performed, such as a prediction block on which prediction is now performed or a coding block on which prediction is now performed. For example, if one coding block is partitioned into two prediction blocks, a block on which prediction is now performed, from among the partitioned prediction blocks, can be designated as a current block.

In an embodiment of the present invention, an image coding method and an image decoding method to be described later can be performed by the elements of the image coder and image decoder described with reference to FIGS. 1 and 2. The element can include not only a hardware meaning, but also a software processing unit that can be performed by an algorithm.

Hereinafter, a method of setting the reference picture index of a temporal merging candidate disclosed in an embodiment of the present invention can be used both in SKIP mode in an image processing method and merge mode, that is, one of modes, in an inter-frame prediction method. SKIP mode is an image processing method of outputting a block, predicted based on motion prediction information derived from surrounding blocks, as a reconstructed block without generating a residual block. Merge mode, that is, one of modes, in an inter-frame prediction method is an image processing method which is the same as SKIP mode in that a block is predicted based on motion prediction information derived from surrounding blocks, but is different from SKIP mode in that a block reconstructed by adding a residual block and a prediction block by coding and decoding information on the residual block is outputted. Intra-loop filtering methods, such as deblocking filtering and a sample adaptive offset, can be additionally applied to the outputted reconstructed block.

Figure 3:
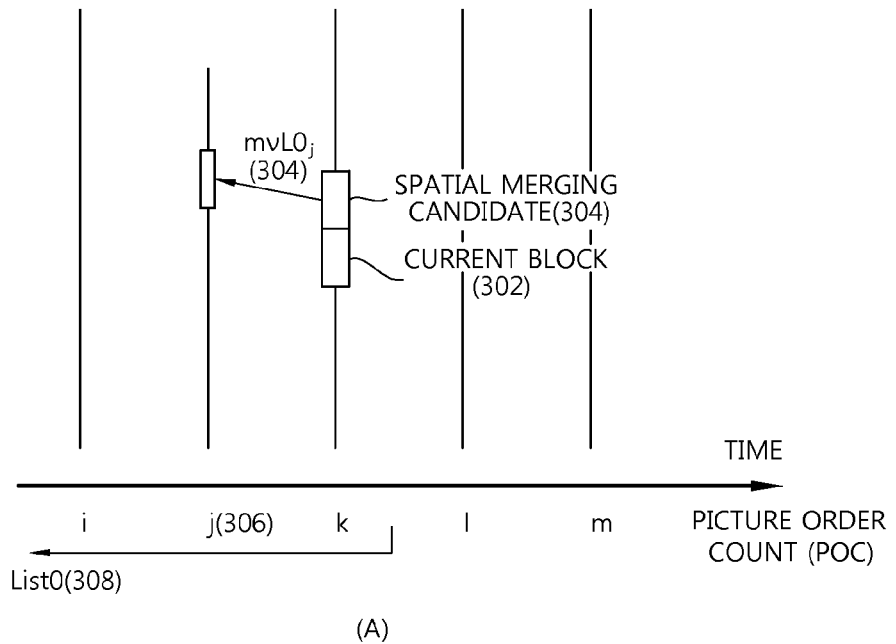
FIG. 3 is a conceptual diagram illustrating an inter-frame prediction method using merge mode in accordance with an embodiment of the present invention.
Figure 3:
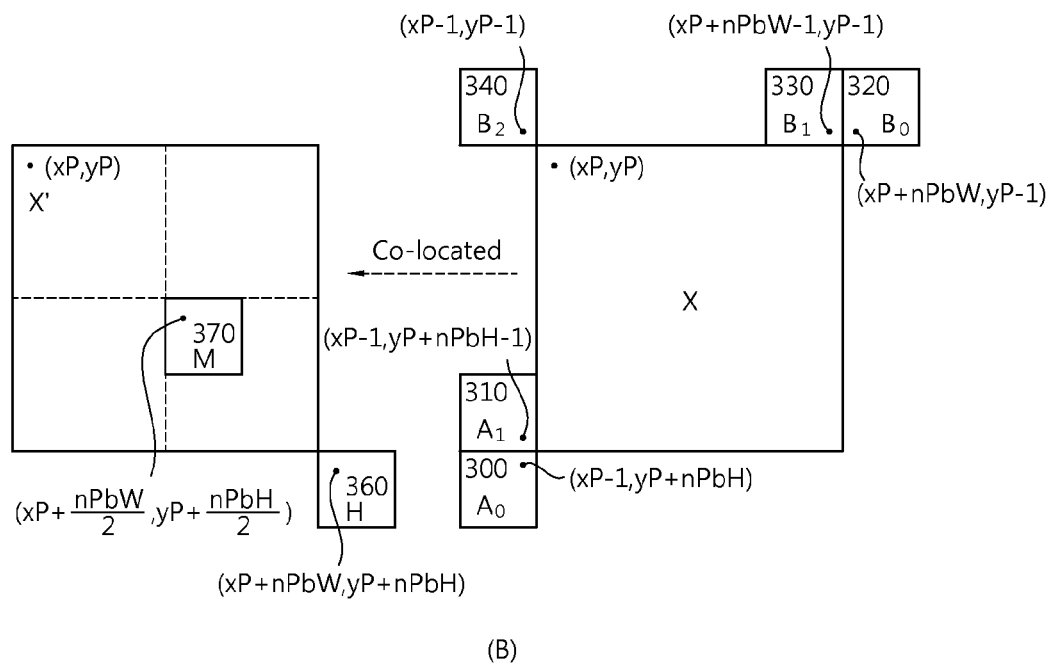

FIG. 3 is a conceptual diagram illustrating an inter-frame prediction method using merge mode in accordance with an embodiment of the present invention.

Referring to FIG. 3, the inter-frame prediction using merge mode can be performed as follows.

The inter-frame prediction method using merge mode refers to a method of deriving a merging candidate from a block neighboring a current block and performing inter-frame prediction by using the derived merging candidate. The neighboring block used to derive the merging candidate can be partitioned into a block which is located in the same picture as a current block and neighbors the current block and a block which is located in a picture different from a picture including a current block and at a location collocated with the current block.

Hereinafter, in an embodiment of the present invention, from among neighboring blocks used to derive a merging candidate, a block which is located in the same picture as a current block and neighbors the current block is defined as a spatial merging candidate block, and motion prediction-related information derived from the spatial merging candidate block is defined as a spatial merging candidate. Furthermore, from among neighboring blocks used to derive a merging candidate, a block which is located in a picture different from a picture including a current block and at a location collocated with the current block is defined as a temporal merging candidate block, and motion prediction-related information derived from the temporal merging candidate block is defined as a temporal merging candidate.

That is, the inter-frame prediction method using merge mode is an inter-frame prediction method for predicting a current block by using motion prediction-related information (i.e., a spatial merging candidate) on a spatial merging candidate block or motion prediction-related information (i.e., a temporal merging candidate) on a temporal merging candidate block to be described later.

For example, motion vectors mvL0/L1, reference picture indices refIdxL0/L1, and pieces of reference picture list utilization information predFlagL0/L1 can be used as the motion prediction-related information.

FIG. 3(A) shows the motion vectors mvL0/L1, the reference picture indices refIdxL0/L1, and the pieces of reference picture list utilization information predFlagL0/L1.

A motion vector 304 is directional information and can be used for a prediction block to derive information on a pixel, located at a specific location, from a reference picture in performing inter-frame prediction. If inter-frame prediction is performed using a plurality of pieces of directional information in a prediction block, motion vectors for respective directions can be indicated by mvL0/L1.

A reference picture index 306 is information on the index of a picture to which a prediction block refers in performing inter-frame prediction. If inter-frame prediction is performed using a plurality of reference pictures, reference pictures can be indexed using respective reference picture indices refIdxL0 and refIdxL1.

The reference picture list utilization information can indicate that a reference picture has been derived from what reference picture list 0 308. For example, pictures i, j, and k can be stored in a reference picture list 0 308 and used. If there are two lists in which a reference picture is stored, information on that the reference picture has been derived from what reference picture list can be indicated by predFlagL0 and predFlagL1.

In order to perform the inter-frame prediction method using merge mode, first, a spatial merging candidate can be obtained through the following step (1). FIG. 3(B) discloses a spatial merging candidate and a temporal merging candidate.

(1) A spatial merging candidate is derived from neighboring blocks for a current block (i.e., a target prediction block).

As described above, a spatial merging candidate is motion prediction-related information derived from a spatial merging candidate block. The spatial merging candidate block can be derived on the basis of the location of a current block.

Referring to FIG. 3(B), the existing spatial merging candidate blocks 300, 310, 320, 330, and 340 have been derived based on a target prediction block. It is assumed that the location of a pixel present at an upper left end of the target prediction block is (xP, yP), the width of a prediction block is nPbW, the height of the target prediction block is nPbH, and MinPbSize is the smallest size of the prediction block. In an embodiment of the present invention hereinafter, the spatial merging candidate blocks of the prediction block can include a block including a pixel present at (xP−1, yP+nPbH), that is, a first block (or an A0 block) 300 on the left side, a block including a pixel present at (xP−1, yP+nPbH−1), that is, a second block (or an A1 block) 310 on the left side, a block including a pixel present at (xP+nPbW, yP−1), that is, a first block (or a B0 block) 320 at the upper end, a block including a pixel present at (xP+nPbW−1, yP−1), that is, a second block (or a B1 block) 330 at the upper end, and a block including a pixel present at (xP−1, yP−1), that is, a third block (or a B2 block) 340 at the upper end. Another value, for example, "MinPbSize" may be used instead of 1. In this case, a block at the same location can be indicated. Coordinates used to indicate the block at the specific location are arbitrary, and the block at the same location may be indicated by various other representation methods.

The locations of the spatial merging candidate blocks 300, 310, 320, 330, and 340 and the number thereof and the locations of the temporal merging candidate blocks 360 and 370 and the number thereof disclosed in FIG. 3 are illustrative, and the locations of spatial merging candidate blocks and the number thereof and the locations of temporal merging candidate blocks and the number thereof can be changed if they fall within the essence of the present invention. Furthermore, order of merging candidate blocks preferentially scanned when a merging candidate list is configured may be changed. That is, the locations of candidate prediction blocks, the number thereof, and a scan order thereof, and a candidate prediction group used when a candidate prediction motion vector list is configured, described in the following embodiment of the present invention, are only illustrative and can be change if they fall within the essence of the present invention.

A spatial merging candidate can be derived from an available spatial merging candidate block by determining whether the spatial merging candidate blocks 300, 310, 320, 330, and 340 are available or not. Information indicating whether a spatial merging candidate can be derived from a spatial merging candidate block or not is availability information. For example, if a spatial merging candidate block is located outside a slice, tile, or a picture to which a current block belongs or is a block on which intra-frame prediction has been performed, a spatial merging candidate, that is, motion prediction-related information, cannot be derived from the corresponding block. In this case, the spatial merging candidate block can be determined to be not available. In order to determine availability information on the spatial merging candidate, some determination methods can be used and embodiments thereof are described in detail later.

If a spatial merging candidate block is available, motion prediction-related information can be derived and used to perform inter-frame prediction using merge mode on a current block.

One coding block can be partitioned into one or more prediction blocks. That is, a coding block can include one or more prediction blocks. If a plurality of prediction blocks is included in a coding block, each of the prediction blocks can be indicated by specific index information. For example, if one coding block is partitioned into two prediction blocks, the two prediction blocks can be indicated by setting the partition index of one prediction block to 0 and the partition index of the other prediction block to 1. If a partition index is 0, a prediction block may be defined as another term, such as a first prediction block. If a partition index is 1, a prediction block may be defined as another term, such as a second prediction block. If one coding block is further partitioned into additional prediction blocks, index values indicative of the prediction blocks can be increased. The terms defined to designate the prediction blocks are arbitrary, and the terms may be differently used or differently interpreted. The partition index of a prediction block may also be used as information indicative of order that image processing, such as coding and decoding, is performed when a prediction block performs the image processing.

If a plurality of prediction blocks is present within one coding block, there may be a case where coding or decoding on another prediction block must be first performed when a spatial merging candidate for the prediction block is derived. In accordance with an embodiment of the present invention, a method of deriving spatial merging candidates and temporal merging candidates in parallel to each of prediction blocks included in one coding block when generating a merging candidate list is additionally disclosed in detail.

(2) Determine the reference picture index of a temporal merging candidate.

A temporal merging candidate is motion prediction-related information derived from a temporal merging candidate block that is present at a picture different from a picture including a current block. The temporal merging candidate block is derived based on a block that is at a location collocated based on the location of the current block. The term 'colocated block' can be used as the same meaning as the temporal merging candidate block.

Referring back to FIG. 3, the temporal merging candidate blocks 360 and 370 can include the block 360 including a pixel at a location (xP+nPSW, yP+nPSH) in the colocated picture of a current prediction block or the block 370 including a pixel at a location (xP+(nPSW>>1), yP+(nPSH>>1)) if the block 360 including the pixel at the location (xP+nPSW, yP+nPSH) is not available, on the basis of the pixel location (xP, yP) within the picture including the prediction block. The prediction block 360 including the pixel at the location (xP+nPSW, yP+nPSH) in the colocated picture can be called a first temporal merging candidate block (or a first colocated block) 360, and the prediction block including the pixel at the location (xP+(nPSW>>1), yP+(nPSH>>1)) in the colocated picture can be called a second temporal merging candidate block 370.

Finally, the final temporal merging candidate block used to derive a temporal merging candidate (or motion prediction-related information) can be at a location partially moved on the basis of the locations of the first temporal merging candidate block 360 and the second temporal merging candidate block 370. For example, if only pieces of motion prediction-related information on some prediction blocks present in a colocated picture are stored in memory, a block at a location partially moved on the basis of the locations of the first temporal merging candidate block 360 and the second temporal merging candidate block 370 can be used as the final temporal merging candidate block for deriving the final motion prediction-related information. Like in a spatial merging candidate block, the location of a temporal merging candidate block can be changed or added unlike in FIG. 3, and an embodiment thereof is described later.

The reference picture index of a temporal merging candidate is information indicative of a picture that is referred in order for a current block to perform inter-frame predict on the basis of a motion vector mvLXCol derived from a temporal merging candidate.

Figure 4:
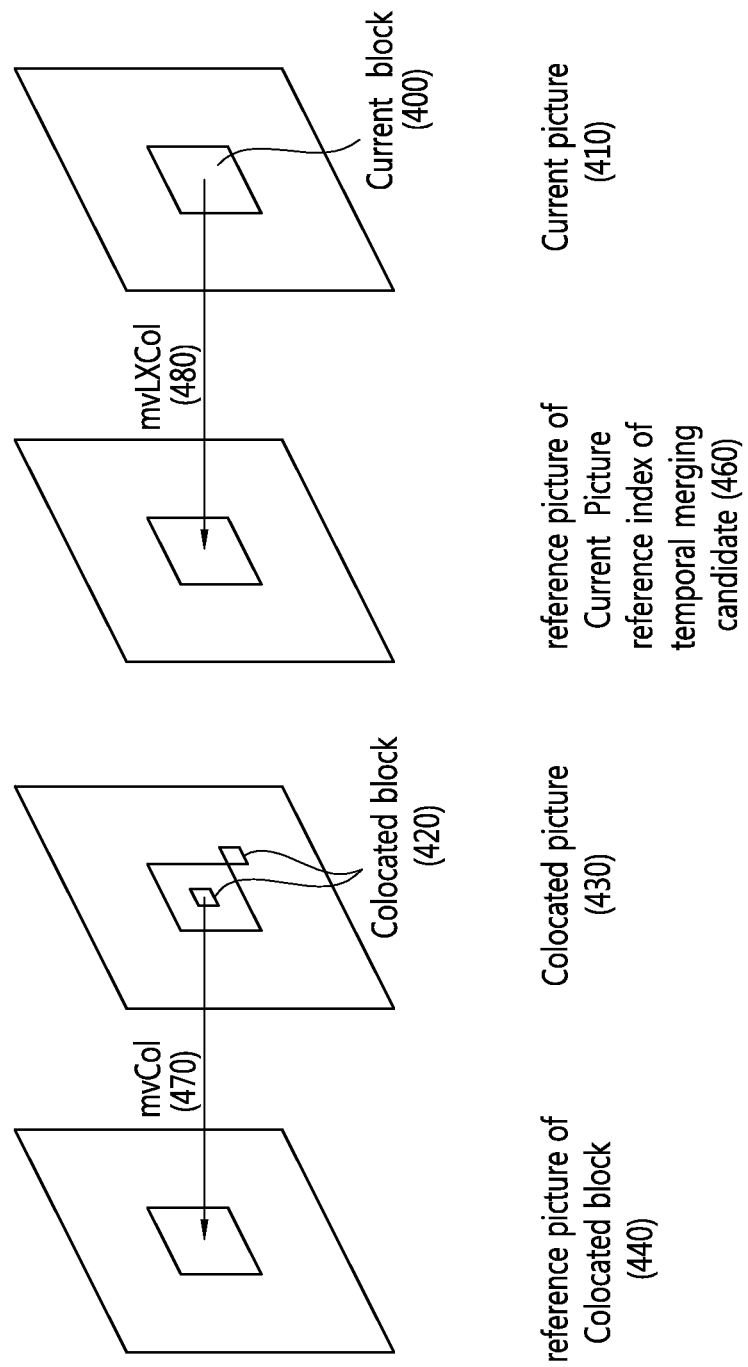
FIG. 4 is a conceptual diagram illustrating inter-frame prediction using a temporal merging candidate and the reference picture index of the temporal merging candidate in accordance with an embodiment of the present invention.

FIG. 4 is a conceptual diagram illustrating inter-frame prediction using a temporal merging candidate and the reference picture index of the temporal merging candidate in accordance with an embodiment of the present invention.

Referring to FIG. 4, a current block 400, a picture 410 including the current block, a temporal merging candidate block (or a colocated block) 420, and a colocated picture 430 including the colocated block can be defined.

From a viewpoint of the temporal merging candidate block 420, there is a picture 440 used in inter-frame prediction by the temporal merging candidate block in order to perform the inter-frame prediction on the temporal merging candidate block 420. This picture is defined as the reference picture 440 of the colocated picture 430. Furthermore, a motion vector that is used by the temporal merging candidate block 420 in order to perform inter-frame prediction from the reference picture 440 of the colocated picture 430 can be defined as mvCol 470.

From a standpoint of the current block 400, a reference picture 460 used in the inter-frame prediction of the current block 400 on the basis of the calculated mvCol 470 has to be defined. The reference picture defined to be used in the inter-frame prediction of the current block 400 can be called the reference picture 460 of a temporal merging candidate. That is, the index of the reference picture 460 of the temporal merging candidate (i.e., the reference index of the temporal merging candidate) is a value indicative of a reference picture used in the temporal motion prediction of the current block 400. At the step (2), the reference picture index of a temporal merging candidate can be determined.

A mvCol 470, that is, a motion vector derived from the temporal merging candidate block 420, can be scaled and transformed into a different value depending on the distance between the colocated picture 430 and the reference picture 440 of the colocated picture and the distance between the picture 410 including the current block and the reference picture 460 of the temporal merging candidate derived through the step (2).

That is, inter-frame prediction according to the temporal merging candidate of the current block 400 can be performed based on mvLXCol 480 derived through a step (3) to be described later, on the basis of the reference picture index 460 of the temporal merging candidate derived through the step (2) and the reference picture index 460 of the temporal merging candidate. mvLXCol can be defined as a temporal motion vector.

Figure 5:
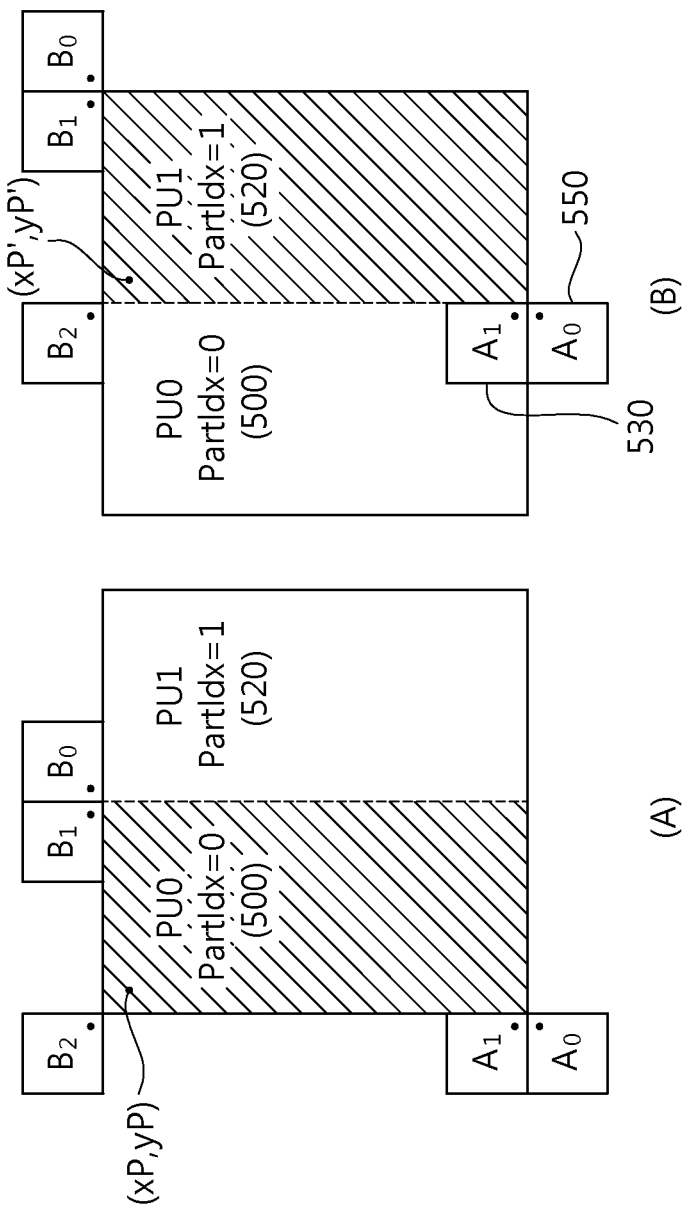
FIG. 5 is a conceptual diagram illustrating a case where one coding block is partitioned into two prediction blocks.

In the existing image coding/decoding methods, the reference picture index of a temporal merging candidate can be determined based on the reference picture index candidate of a temporal merging candidate derived from the reference picture index of a spatial merging candidate in a target prediction block. If this method is used, there may be a case where the reference picture index of a spatial merging candidate that has not yet been coded or decoded must be derived. In this case, the reference picture index of the spatial merging candidate can be derived only when coding or decoding on a prediction block including the corresponding spatial merging candidate is finished. Accordingly, if the reference picture index of a temporal merging candidate is determined based on the reference picture index candidates of temporal merging candidates derived from all spatial merging candidate blocks, a process of deriving the reference pictures of the temporal merging candidates for a current block cannot be performed in parallel. FIG. 5 discloses this problem.

FIG. 5 is a conceptual diagram illustrating a case where one coding block is partitioned into two prediction blocks.

Referring to FIG. 5, one coding block is partitioned into a first prediction block 500 and a second prediction block 520 having an N×2N form. Spatial merging candidate blocks for the first prediction block 500 are derived on the basis of the location of the first prediction block 500 as in FIG. 5(A), and spatial merging candidate blocks for the second prediction block 520 are derived on the basis of the location of the second prediction block 520 as in FIG. 5(B). Although not shown, in temporal merging candidate blocks, temporal merging candidates can be derived on the basis of the location of each of prediction blocks.

The spatial merging candidate blocks of the first prediction block 500 are outside the first prediction block 500 and are at locations included in blocks on which coding or decoding has already been performed.

In contrast, an A1 block 530, from among the spatial merging candidate blocks of the second prediction block 520, is present within the first prediction block 500. Accordingly, after prediction on the first prediction block 500 is performed, motion prediction-related information (e.g., a motion vector, a reference picture index, and reference picture list utilization information) on the A1 block 530 can be known. Furthermore, the motion prediction-related information of the A0 block 550 cannot be derived because the A0 block 550 is at a location that has not yet been coded or decoded.

If the reference picture index of a temporal merging candidate is derived from the motion prediction-related information of the A1 block 530, it can be derived after coding and decoding on the first prediction block 500 are finished. Furthermore, the reference picture index cannot be derived from the A0 block 550. That is, since the reference picture indices of some spatial merging candidate blocks cannot be derived, the reference picture indices of temporal merging candidates for respective prediction blocks cannot be derived in parallel.

In an embodiment of the present invention, in order to solve the problem, methods of deriving the reference picture indices of temporal merging candidates (or the reference indices of temporal merging candidates) for prediction blocks are disclosed.

If a method of deriving the reference picture indices of temporal merging candidates in accordance with an embodiment of the present invention is used, processes of deriving the reference picture indices of temporal merging candidates for some prediction blocks can be performed in parallel. Since the reference picture indices of temporal merging candidates are derived in parallel, inter-frame prediction processes using merge mode for a plurality of prediction blocks included in one coding block can be performed in parallel.

Hereinafter, in an embodiment of the present invention, a method of deriving the reference picture index of a temporal merging candidate is disclosed and additionally described in detail.

(3) Derive motion prediction-related information on a temporal merging candidate block.

At the step (3), in order to perform motion prediction based on a temporal merging candidate, temporal merging candidates, such as information on whether a temporal merging candidate block is available or not (availableFlagCol), reference picture list utilization information (PredFlagLXCol), and information on the motion vector (mvLXCol) of a temporal merging candidate, can be derived. The motion prediction-related information derived from the temporal merging candidate can be defined as a term 'temporal merging candidate'. The availability information on the temporal merging candidate block indicates whether a temporal merging candidate can be derived from the temporal merging candidate block or not. The temporal merging candidate can be included in a merging candidate list on the basis of the availability information on the temporal merging candidate block.

(4) Derive a merging candidate list.

A merging candidate list can include information on a merging candidate that can be used in inter-frame prediction using merge mode on the basis of availability information on a merging candidate block (i.e., a spatial merging candidate block or a temporal merging candidate block). One of merging candidates included in a merging candidate list can be used to perform inter-frame prediction using merge mode on a current block. Information on whether what merging candidate will be used to predict a current block (i.e., a merging index) can be coded in a coding step and transmitted to a decoder.

A merging candidate list can be generated with the following order of priority.

1) If an A1 block is available, a merging candidate derived from the A1 block

2) If a B1 block is available, a merging candidate derived from the B1 block

3) If a B0 block is available, a merging candidate derived from the B0 block

4) If an A0 block is available, a merging candidate derived from the A0 block

5) If a B2 block is available, a merging candidate derived from the B2 block

6) If a Col block is available, a merging candidate derived from the Col block

The merging candidate list can include, for example, 0 to 5 merging candidates depending on the number of available blocks. If the number of blocks used to derive a merging candidate is many, more merging candidates may be included in the merging candidate list.

(5) If the number of merging candidates included in a merging candidate list is smaller than a maximum number of merging candidates that can be included in the merging candidate list, an additional merging candidate is derived.

An additional merging candidate can be a candidate generated by combining pieces of motion prediction-related information on the existing merging candidates (i.e., a combined merging candidate) or can be a 0-vector merging candidate (i.e. . . . , a zero merging candidate). Here, the 0-vector merging candidate designates a merging candidate having a motion vector (0,0).

(6) Determine a merging candidate applied to inter-frame prediction performed on a current block, from among merging candidates included in a merging candidate list, and set motion prediction-related information on the determined merging candidate as motion prediction-related information on a current block.

In a decoding process, inter-frame prediction using merge mode can be performed on a current block on the basis of a merging index merge_idx[xP][yP], that is, information on which one of candidates included in a merging candidate list is used in inter-frame prediction performed on the current block.

Through a procedure of the step (1) to the step (6), motion prediction-related information on a current block can be derived and inter-frame prediction can be performed on the current block based on the derived motion prediction-related information.

An embodiment of the present invention discloses a method of deriving the reference picture indices of temporal merging candidates for a plurality of prediction blocks, included in one coding block, in parallel in setting the reference picture index of a temporal merging candidate at the step (2) is disclosed.

Various kinds of methods below can be used as the method of deriving the reference picture indices of temporal merging candidates for a plurality of prediction blocks, included in a coding block, in parallel.

1) A method of setting the location of a spatial merging candidate block, used to derive the reference picture index candidate of a temporal merging candidate for a target prediction block (i.e., a current block), as a location at which a coding block including the current block is located and on which coding or decoding has already been performed.

2) A method of, if the location of a spatial merging candidate block used to derive the reference picture index candidate of a temporal merging candidate for a target prediction block (i.e., a current block) is within a coding block or a location on which coding has not yet been performed, setting the reference picture index candidate of a temporal merging candidate derived from a spatial merging candidate at the corresponding location to '0'.

3) A method of setting the reference picture index of the temporal merging candidate of a target prediction block (i.e., a current block) to '0' that is a fixed value.

4) A method of, if the location of a spatial merging candidate block referred to derive the reference picture index candidate of the temporal merging candidate of a target prediction block (i.e., e current block) is within a coding block or a location on which coding has not yet been performed, not using the reference picture index of the spatial merging candidate block at the corresponding location in order to derive the reference picture index of the temporal merging candidate.

5) A method of previously determining a spatial merging candidate block at a specific location that is referred to derive the reference picture index of the temporal merging candidate of a target prediction block (i.e., a current block) and deriving the reference picture index of the temporal merging candidate from the spatial merging candidate block at the specific location.

6) A method of, if the locations of some of the spatial merging candidate blocks of spatial merging candidates derived to perform mergence on a target prediction block (i.e., a current block) are within a coding block or locations on which coding has not yet been performed and thus pieces of information on the reference picture indices of temporal merging candidates cannot be derived from the spatial merging candidate blocks at the corresponding locations, fixing the spatial merging candidate blocks at the corresponding locations as locations outside the coding block on which coding or decoding has been performed.

The following embodiments of the present invention disclose the methods of deriving the reference picture index of a temporal merging candidate in detail.

First, problems occurring when determining the reference picture index of a temporal merging candidate in the prior art, described with reference to FIG. 5, are described in detail with reference to FIG. 6.

Figure 6:
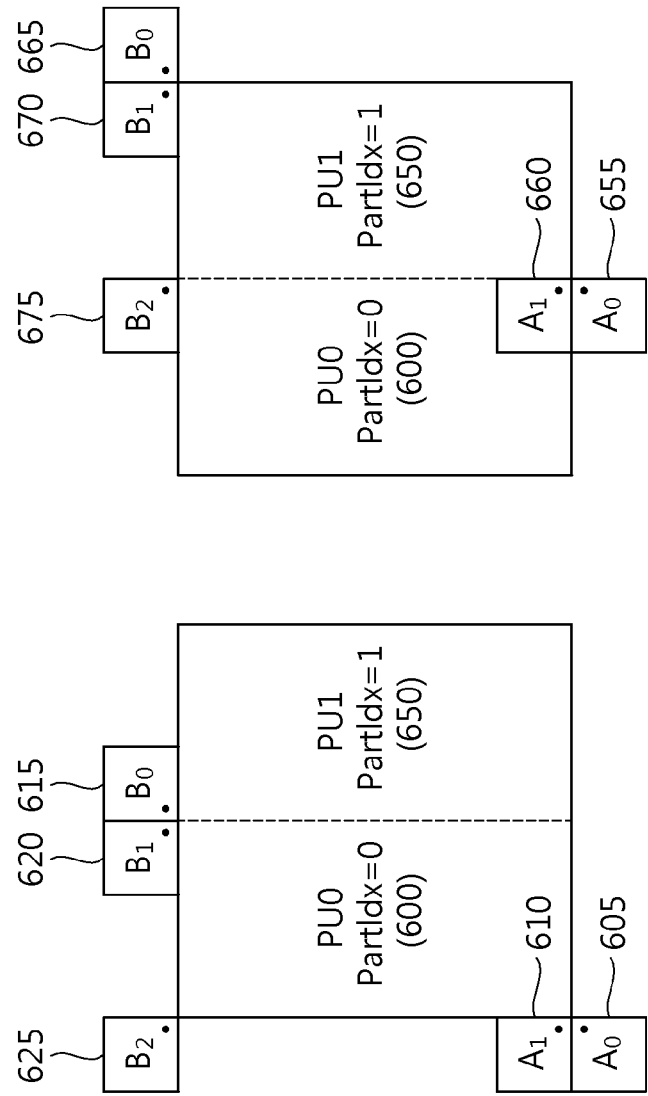
FIG. 6 is a conceptual diagram illustrating a method of setting the reference picture index of a temporal merging candidate in accordance with an embodiment of the present invention.

FIG. 6 is a conceptual diagram illustrating a method of setting the reference picture index of a temporal merging candidate in accordance with an embodiment of the present invention.

Referring to FIG. 6, one coding block (e.g., a 2N×2N form) can be partitioned into two prediction blocks (e.g., N×2N). In the first prediction block 600 of the two partitioned blocks, all spatial merging candidate blocks 605, 610, 615, 620, and 625 are present outside the coding block. In contrast, in the second prediction block 650 of the two partitioned blocks, some (e.g., 655, 665, 670, and 675) of spatial merging candidate blocks 655, 660, 665, 670, and 675 are present outside the coding block, and some (e.g., 660) of the spatial merging candidate blocks 655, 660, 665, 670, and 675 are present within the coding block.

The reference picture index of a temporal merging candidate for a current block (i.e., a target prediction block) can be derived from the reference picture index of a spatial merging candidate. That is, the reference picture index of a temporal merging candidate for a current block can be derived based on information on a reference picture index that has been used by a spatial merging candidate block to perform inter-frame prediction.

For example, it can be assumed that the reference picture indices of three of a plurality of spatial merging candidates for a current block are refIdxLXA, refIdxLXB, and refIdxLXC. Pieces of information on the reference picture indices refIdxLXA, refIdxLXB, and refIdxLXC can become the reference picture index candidates of temporal merging candidates, and the reference picture index values of the temporal merging candidates can be derived based on the reference picture index candidates of the temporal merging candidates.

If the above method is used, spatial merging candidate blocks for a current block need to be coded or decoded in advance because pieces of information on the reference picture indices of the spatial merging candidate blocks for the current block are necessary to derive the reference picture indices of temporal merging candidates for the current block.

Referring back to FIG. 6, the first prediction block 600 is a block in which the spatial merging candidates are included in locations outside the coding block on which coding or decoding has already been performed as described above. Accordingly, if the first prediction block 600 is a current block on which prediction is performed, the reference picture index candidates of temporal merging candidates for the first prediction block 600 can be directly derived from the spatial merging candidate blocks of the first prediction block 600.

In the second prediction block 650, however, some (e.g., 660) of the spatial merging candidates are present in the first prediction block 600 that is within the coding block as described above. Accordingly, when inter-frame prediction using merge mode is performed on the second prediction block 650, the reference picture indices of temporal merging candidates for the first prediction block 650 cannot be derived until the A1 block 660 is coded or decoded, that is, until prediction is performed on the first prediction block 600 including the A1 block 660. In this case, there is a problem in that inter-frame prediction using merge mode cannot be performed on the first prediction block 600 and the second prediction block 650 in parallel because the temporal merging candidates of the second prediction block 650 are not derived until prediction is performed on the first prediction block 600. In order to solve the problem, a variety of methods can be used.

Only some of the partition forms of a prediction block are disclosed in the following embodiments of the present invention, for convenience of description, but the present invention can be applied to the partition forms of several prediction blocks of a coding block and embodiments thereof are also included in the scope of the present invention.

Figure 7:
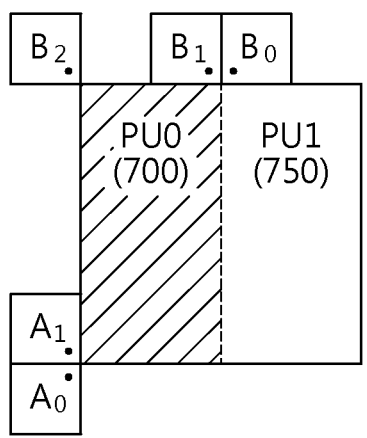
FIG. 7 is a conceptual diagram illustrating a method of deriving the reference picture indices of temporal merging candidates in accordance with an embodiment of the present invention.
Figure 7:
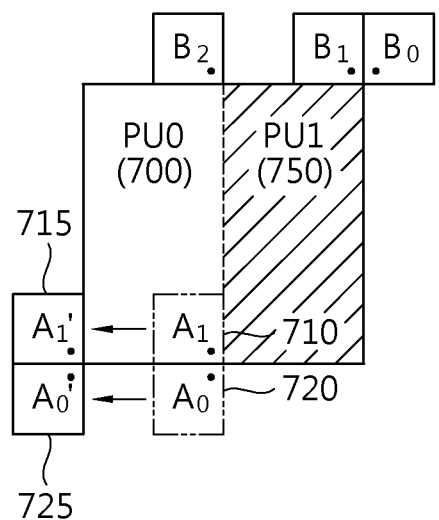
Figure 7:
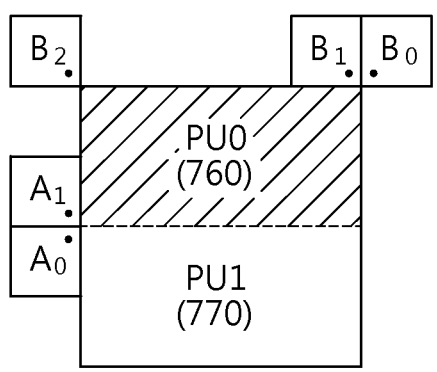
Figure 7:
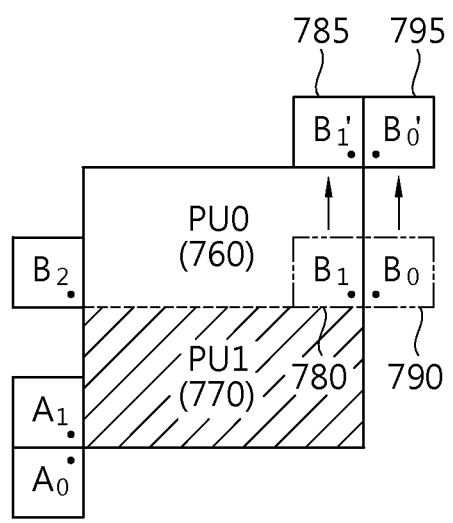

FIG. 7 is a conceptual diagram illustrating a method of deriving the reference picture indices of temporal merging candidates in accordance with an embodiment of the present invention.

The embodiment of FIG. 7 discloses a method of setting the locations of spatial merging candidate blocks to which reference is made by a prediction block in order to derive the reference picture indices of temporal merging candidates as locations outside a coding block including a current prediction block.

FIG. 7(A) shows a case where one coding block is partitioned into two prediction blocks 700 and 750 having an N×2N form.

All the spatial merging candidate blocks of the first prediction block 700 are at locations outside a coding unit on which coding or decoding has already been performed. Thus, the reference picture index candidates of temporal merging candidates for the first prediction block 700 can be directly derived by using the already coded or decoded spatial merging candidate blocks.

In the case of the second prediction block 750, however, the locations of some (e.g., 710 and 720) of spatial merging candidate blocks used to derive the reference picture indices of temporal merging candidates can be changed, and the reference picture indices of the temporal merging candidates can be derived from the changed locations.

In order to derive the reference picture index candidates of the temporal merging candidates, the spatial merging candidate block 710 can be replaced with a block 715 outside the coding block without using the spatial merging candidate block 710 included in the coding unit, from among the spatial merging candidate blocks of the second prediction block 750, and the reference picture index of the block 715 can be used as the reference picture index candidate of a temporal merging candidate.

Furthermore, the spatial merging candidate block 720 can be replaced with a block 725 outside the coding block without using the block 720 outside the coding unit on which coding or decoding has not yet been performed, from among the spatial merging candidate blocks, and the reference picture index of the block 725 can be used as the reference picture index candidate of a temporal merging candidate.

That is, the reference picture index candidates of the temporal merging candidates can be derived by using an A0' block 725 and an A1' block 715 outside the coding block instead of the A0 block 710 and the A1 block 720 of the second prediction block 750.

If the above method is used, all the spatial merging candidate blocks used to derive the reference picture indices of the temporal merging candidates can become blocks included in an already coded block in the second prediction block 750. Accordingly, in the second prediction block 750, the reference picture indices of the temporal merging candidates can be derived irrespective of whether or not a prediction process has been performed on the first prediction block 700.

FIG. 7(B) shows a case where one coding block is partitioned into two prediction blocks having a 2N×N form.

As in FIG. 7(A), in FIG. 7(B), instead of a B1 block 780, that is, a block included within the coding block, and a B0 block 790, that is, a block on which coding or decoding has not yet been performed, from among the spatial merging candidate blocks of a second prediction block 770, a B1' block 785 and a B0' block 795 that are already coded blocks can be used to derive the reference picture indices of temporal merging candidates for the second prediction block 770.

Figure 8:
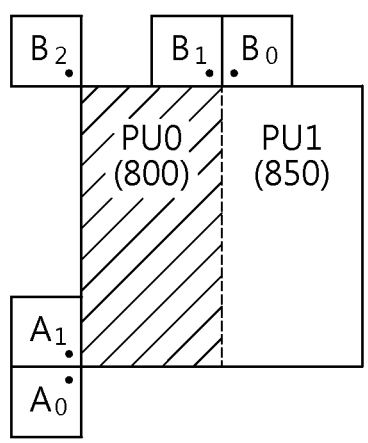
FIG. 8 is a conceptual diagram illustrating a method of deriving the reference picture indices of temporal merging candidates in accordance with an embodiment of the present invention.
Figure 8:
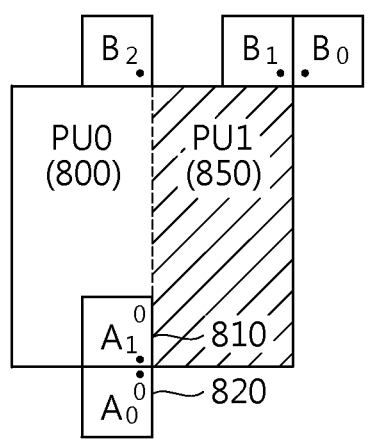
Figure 8:
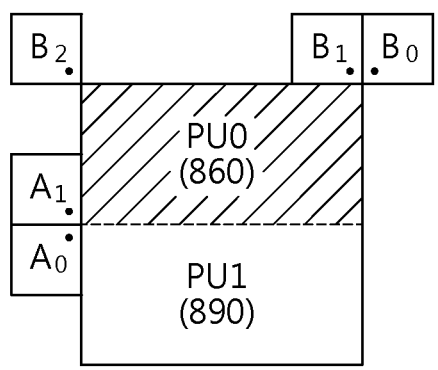
Figure 8:
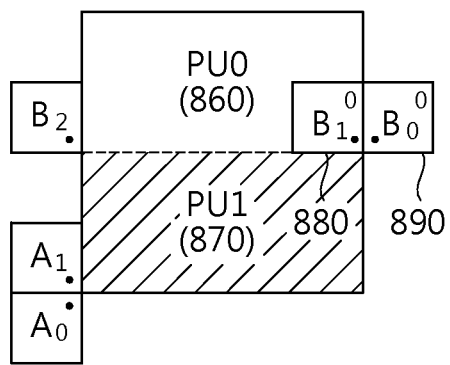

FIG. 8 is a conceptual diagram illustrating a method of deriving the reference picture indices of temporal merging candidates in accordance with an embodiment of the present invention.

The embodiment of FIG. 8 discloses a method of setting the reference picture index candidates of temporal merging candidates, derived from a spatial merging candidate block present within a coding block and a spatial merging candidate block present in a location on which coding or decoding has not yet been performed, to '0', if the locations of spatial merging candidate blocks referred to derive the reference picture indices of temporal merging candidates for a target prediction block (i.e., a current block) are within the coding block including the current block or are locations on which coding or decoding has not yet been performed.

FIG. 8(A) shows a case where one coding block is partitioned into two prediction blocks having an N×2N form.

Referring to FIG. 8(A), all the spatial merging candidate blocks of a first prediction block 800 are at locations outside the coding unit on which coding or decoding has already been performed. Accordingly, the reference picture index candidates of temporal merging candidates for the first prediction block 800 can be derived from the spatial merging candidate blocks of the first prediction block 800.

In the case of a second prediction block 850, assuming that the reference picture indices of some spatial merging candidate blocks (e.g., 810 and 820) are '0', the reference picture index candidates of temporal merging candidate for the second prediction block 850 can be derived. In relation to a spatial merging candidate block located within the coding block including a target prediction block (i.e., a current block) or a spatial merging candidate block at a location on which coding or decoding has not yet been performed, the reference picture index candidate of a temporal merging candidate derived from a corresponding spatial merging candidate block can be set to '0' and the reference picture index of a temporal merging candidate for the current block can be derived from the set reference picture index candidate.

For example, a process of setting the reference picture index candidates of temporal merging candidates, derived from the A0 block 810 and the A1 block 820 of the second prediction block 850, to '0' in advance when deriving the reference picture index candidates of the temporal merging candidates and deriving the reference picture indices of the temporal merging candidates from the set reference picture index candidates can be used.

FIG. 8(B) shows a case where one coding block is partitioned into two prediction blocks having a 2N×N form.

All the spatial merging candidate blocks of a first prediction block 860 are at locations outside the coding unit on which coding or decoding has been completed. Accordingly, the reference picture index candidates of temporal merging candidates for the first prediction block 860 can be directly derived from the spatial merging candidate blocks of the first prediction block 860.

The reference picture index candidate of a temporal merging candidate derived from a spatial merging candidate block 880 included in a prediction block on which prediction has not yet been performed or some spatial merging candidate blocks (e.g., 890) at locations on which a coding or decoding process has not yet been performed can be set to '0', when deriving the reference picture indices of temporal merging candidates for a second prediction block 870. The reference picture index candidates of the temporal merging candidates can be derived from the set reference picture index candidates.

For example, the above method can be used in a process of setting the reference picture indices of temporal merging candidates derived from a B0 block 880 and a B1 block 890, that is, the spatial merging candidate blocks of the second prediction block 870, to '0' and deriving the reference picture indices of the temporal merging candidates for the second prediction block 870.

Figure 9:
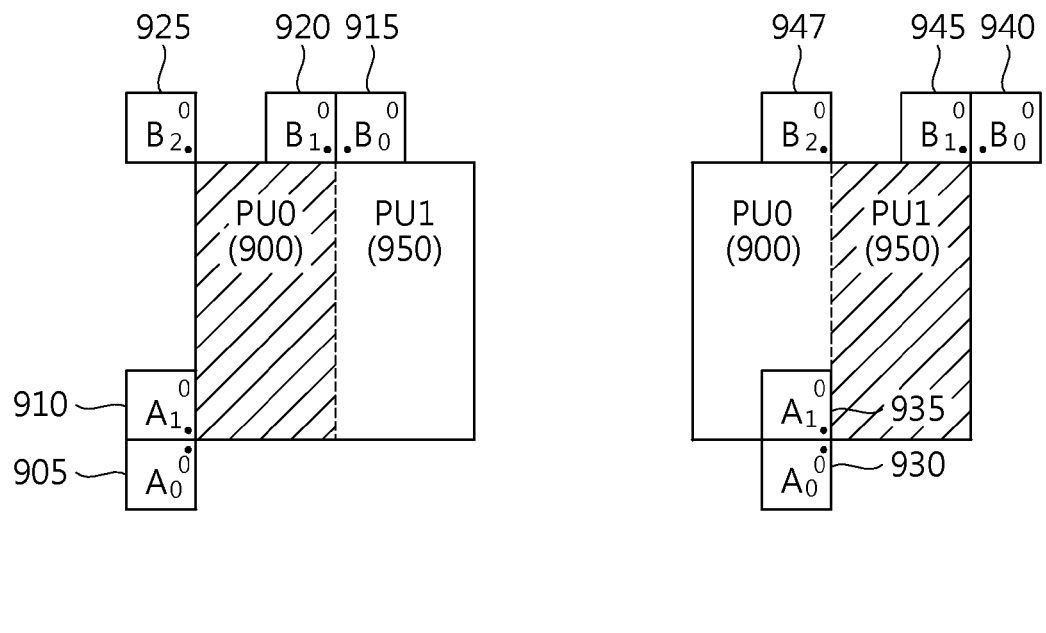
FIG. 9 is a conceptual diagram illustrating a method of deriving the reference picture indices of temporal merging candidates in accordance with an embodiment of the present invention.
Figure 9:
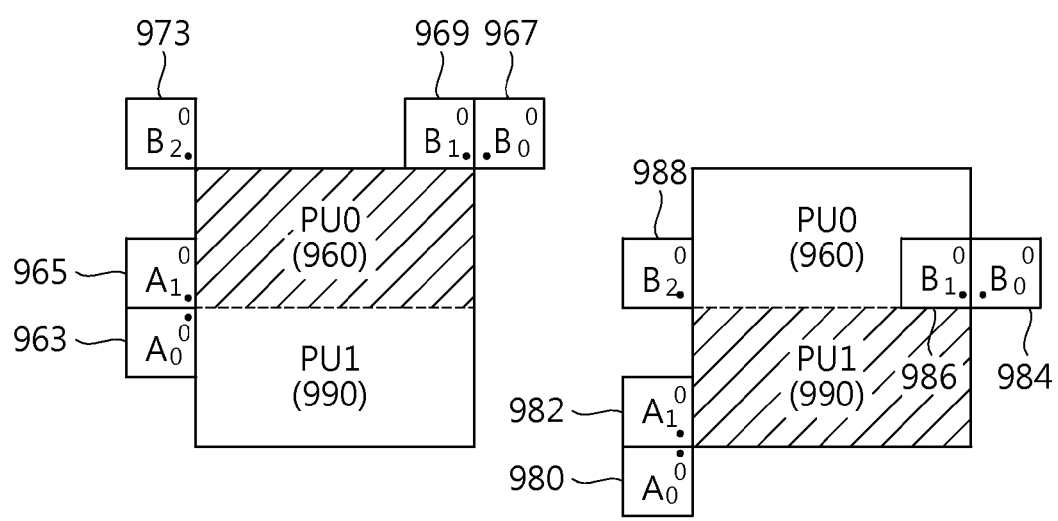

FIG. 9 is a conceptual diagram illustrating a method of deriving the reference picture indices of temporal merging candidates in accordance with an embodiment of the present invention.

The embodiment of FIG. 9 discloses a method in which a prediction block sets the reference picture index of a temporal merging candidate to '0', that is, a fixed value, and using the set reference picture index.

FIG. 9(A) shows a case where one coding block is partitioned into two prediction blocks having an N×2N form.

Referring to FIG. 9(A), in order to derive the reference picture indices of temporal merging candidates for a first prediction block 900 and a second prediction block 950, the reference picture index values of temporal merging candidates can be set to '0' and used, without using spatial merging candidate blocks 905 to 925 and 930 to 947. If this method is used, the degree of complexity in the deriving of coding and decoding can be reduced and the speed of coding and decoding can be increased because a step of deriving the reference picture indices of temporal merging candidates is not performed. Furthermore, the reference picture indices of temporal merging candidates for a current block can be derived without a need to wait for until prediction on other prediction blocks included in a current coding block is performed. Accordingly, the reference picture indices of temporal merging candidates for a plurality of prediction blocks included in one coding block can be derived in parallel.

FIG. 9(B) shows a case where one coding block is partitioned into two prediction blocks having a 2N×N form.

Likewise, in FIG. 9(B), in order to derive the reference picture indices of temporal merging candidates for a first prediction block 960 and a second prediction block 990, the reference picture index values of the temporal merging candidates can be fixed to '0' and used without using spatial merging candidates.

In FIG. 9, '0' is marked in the spatial merging candidate blocks, for convenience of description. However, when actually deriving the reference picture indices of temporal merging candidates, a value set to '0' can be used without a procedure for searching for the reference picture indices of the spatial merging candidate blocks. '0' is only an example of a fixed picture index, and another picture index other than 0 may be used and embodiments thereof are also included in the scope of the present invention.

Figure 10:
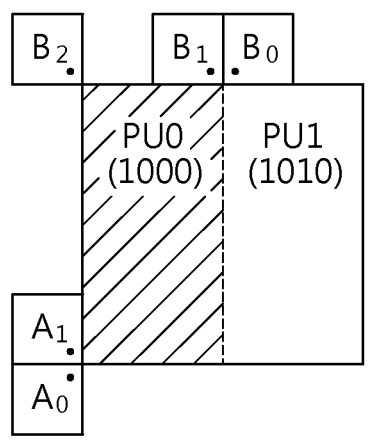
FIG. 10 is a conceptual diagram illustrating a method of deriving the reference picture indices of temporal merging candidates in accordance with an embodiment of the present invention.
Figure 10:
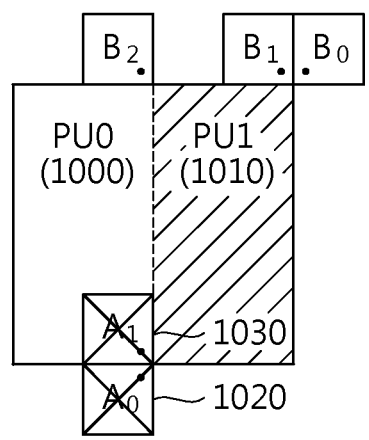
Figure 10:
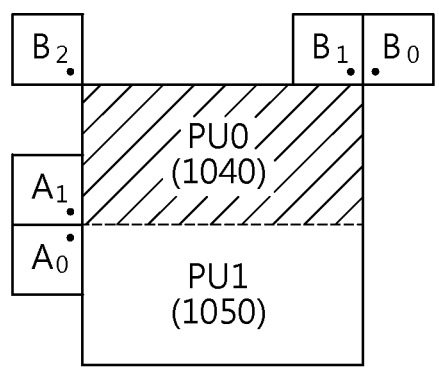
Figure 10:
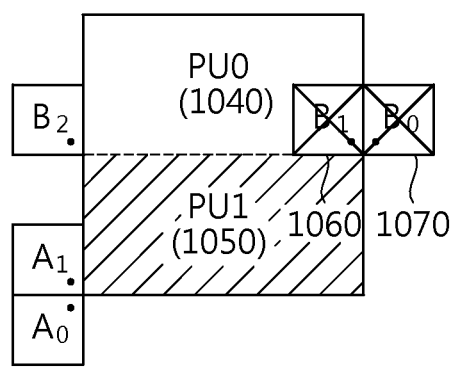

FIG. 10 is a conceptual diagram illustrating a method of deriving the reference picture indices of temporal merging candidates in accordance with an embodiment of the present invention.

The embodiment of FIG. 10 discloses a method of, if the location of a spatial merging candidate block referred to derive the reference picture index of a temporal merging candidate for a current block (i.e., a target prediction block) is within a coding block including the current block or at a location on which coding has not yet been performed, not using the reference picture index of the spatial merging candidate block as a candidate for deriving the reference picture index of the temporal merging candidate.

FIG. 10(A) shows a case where one coding block is partitioned into two prediction blocks having an N×2N form.

Referring to FIG. 10(A), the A1 block 1030 and the A0 block 1020 of a second prediction block 1010 are a block within the coding block including a current block and a block at a location on which coding or decoding has not yet been performed. Pieces of information on the reference picture indices of the A1 block 1030 and the A0 block 1020 cannot be used when deriving the reference picture indices of temporal merging candidates for a first prediction block 1000.

Accordingly, when deriving the reference picture indices of the temporal merging candidates from the second prediction block 1010, the pieces of information on the reference picture indices of the A1 block 1030 and the A0 block 1020 can be set to '−1'. If the reference picture index value of a specific spatial merging candidate block is '−1', the spatial merging candidate block can indicate a block that is not used to derive the reference picture index of a temporal merging candidate.

FIG. 10(B) shows a case where one coding block is partitioned into two prediction blocks having a 2N×N form.

Referring to FIG. 10(B), the B1 block 1060 of a second prediction block 1050 is a spatial merging candidate block within the coding block and is a block whose reference picture index information can be known only when prediction is performed on a first prediction block 1040. The B0 block 1070 of the second prediction block 1050 is a spatial merging candidate block at a location on which coding has not yet been performed, and information on the reference picture index thereof cannot be known.

In this case, in order to derive the reference picture indices of temporal merging candidates from the first prediction block 1040 and the second prediction block 1050 in parallel, pieces of information on the reference picture indices of the B1 block 1060 and the B0 block 1070 can be set to '−1'. That is, the B0 block 1070 and the B1 block 1060 may not be used as blocks for deriving the reference picture index candidates of temporal merging candidates for the second prediction block 1050.

Figure 11:
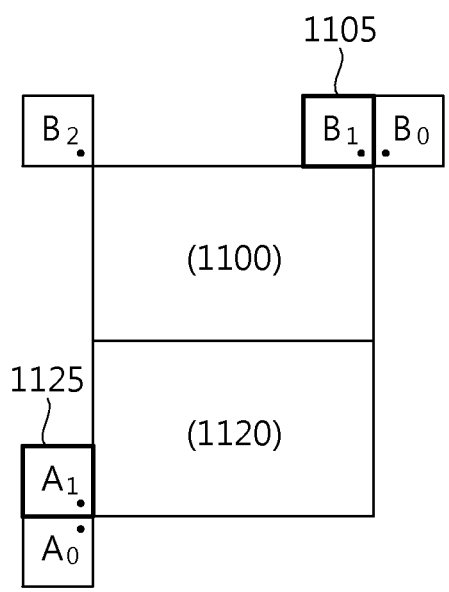
FIG. 11 is a conceptual diagram illustrating a method of deriving the reference picture index of a temporal merging candidate in accordance with an embodiment of the present invention.
Figure 11:
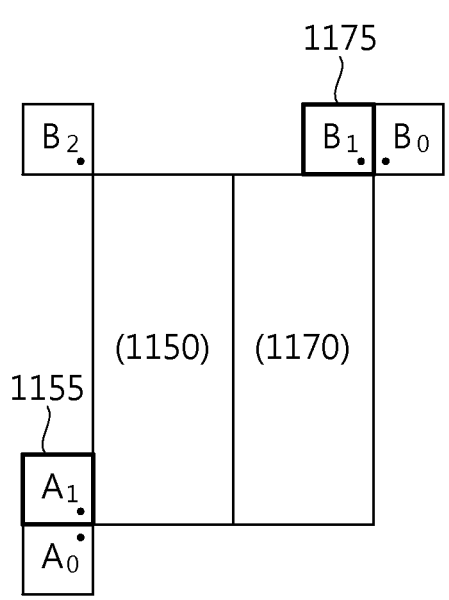

FIG. 11 is a conceptual diagram illustrating a method of deriving the reference picture index of a temporal merging candidate in accordance with an embodiment of the present invention.

The embodiment of FIG. 11 discloses a method of previously determining a specific spatial merging candidate block referred by a prediction block in order to derive the reference picture index of a temporal merging candidate and deriving the reference picture index of the temporal merging candidate from the specific spatial merging candidate block.

FIG. 11(A) shows a case where one coding block is partitioned into two prediction blocks having an N×2N form.

A first prediction block 1100 and a second prediction block 1120 can share spatial merging candidate blocks A0, A1, B0, B1, and B2. That is, the spatial merging candidate blocks A0, A1, B0, B1, and B2 used to perform inter-frame prediction using merge mode in the first prediction block 1100 and the second prediction block 1120 can be blocks outside the coding block.

A reference picture index for the temporal merging of the first prediction block 1100 can be set to the reference picture index value of the B1 block 1105. That is, the fixed reference picture index of a spatial merging candidate block at a specific location of a prediction block can be set to a reference picture index value for the temporal merging of a current block depending on a partition form.

If the B1 block 1125 is not available, the reference picture index value can be set to '0' and used.

Like in the second prediction block 1120, the reference picture index value of the A1 block 1125 can be used as a reference picture index for temporal merging. If the B1 block 1105 is not available, the reference picture index value can be set to '0' and used.

FIG. 11(B) shows a case where one coding block is partitioned into two prediction blocks having a 2N×N form.

A first prediction block 1150 and a second prediction block 1170 can share spatial merging candidate blocks A0, A1, B0, B1, and B2. That is, spatial merging candidate blocks for performing inter-frame prediction using merge mode in the first prediction block 1150 and the second prediction block 1170 can be blocks outside the coding block.

A reference picture index for the temporal merging of the first prediction block 1150 can be set to the reference picture index value of the A1 block 1155. That is, the reference picture index of a spatial merging candidate block at a specific location of a prediction block can be set to a reference picture index value for the temporal merging of a current block depending on a partition form.

If the B1 block 1175 is not available, the reference picture index value can be set to '0' and used.

Like in the second prediction block 1170, the reference picture index value of the B1 block 1175 can be used as a reference picture index for temporal merging. If the B1 block 1175 is not available, the reference picture index value can be set to '0' and used.

Figure 12:
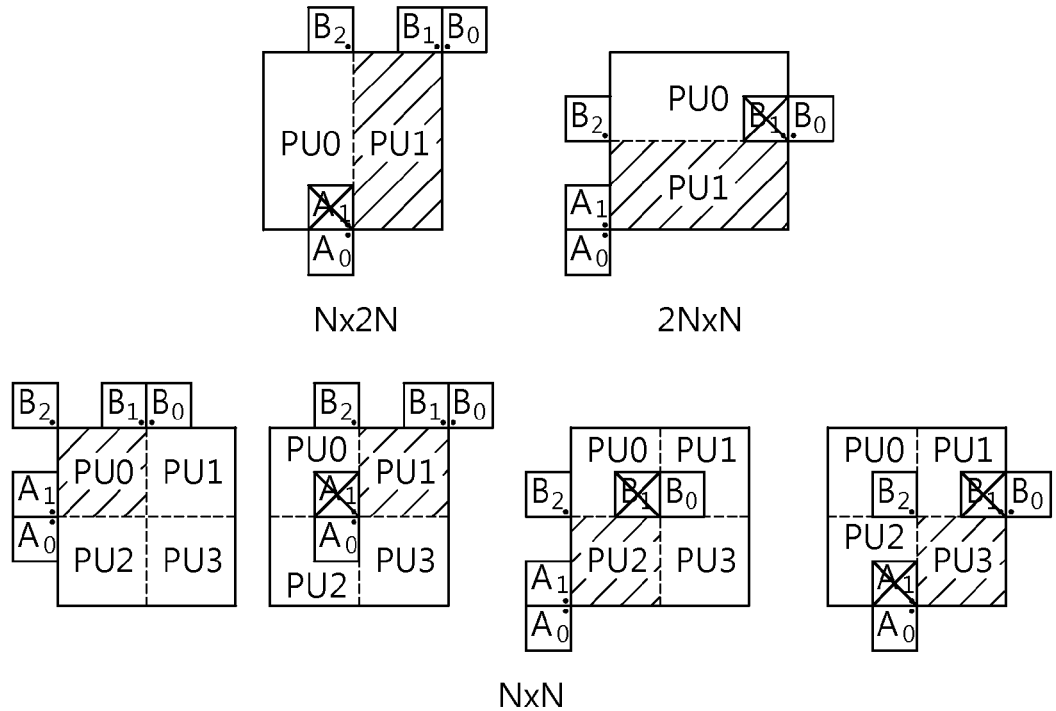
FIG. 12 is a conceptual diagram illustrating a method of deriving the reference picture index of a temporal merging candidate in accordance with an embodiment of the present invention.
Figure 12:
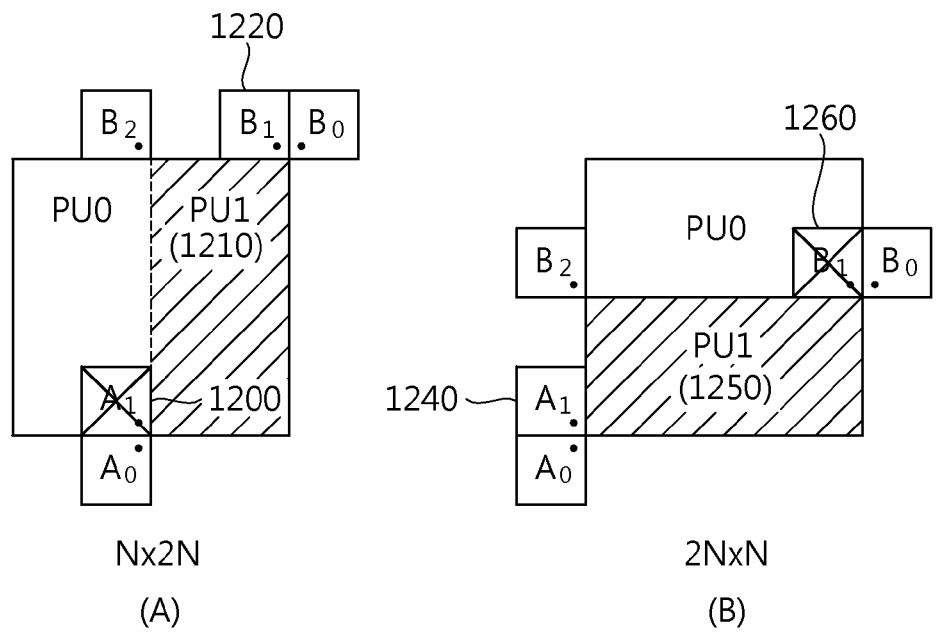

FIG. 12 is a conceptual diagram illustrating a method of deriving the reference picture index of a temporal merging candidate in accordance with an embodiment of the present invention.

The embodiment of FIG. 12 discloses a method of previously determining a specific spatial merging candidate block referred by a target prediction block in order to derive the reference picture index of a temporal merging candidate and deriving the reference picture index of the temporal merging candidate from the specific spatial merging candidate block.

Referring to FIG. 12, different spatial merging candidate blocks can be used to derive the reference picture index of a temporal merging candidate depending on a form of a prediction block partitioned from one coding block.

For example, in a prediction block, one of an A1 block and a B1 block, from among spatial merging candidate blocks, can be used as a block for deriving the reference picture index of a temporal merging candidate. From among the two spatial merging candidate blocks, a spatial merging candidate block within a coding block is not used to derive the reference picture index of the temporal merging candidate, but a spatial merging candidate block outside the coding block can be used to derive the reference picture index of the temporal merging candidate.

Although FIG. 12(A) showing a case where a coding block is partitioned into prediction blocks having an N×2N form and FIG. 12(B) showing a case where a coding block is partitioned into prediction blocks having a 2N×N form are illustrated for convenience of description, the same method can be applied to a coding block partitioned in various forms.

FIG. 12(A) shows a case where a coding block is partitioned into prediction blocks having an N×2N form.

If one coding block is partitioned into prediction blocks having an N×2N form, the reference picture index of a B1 block 1220, that is, a spatial merging candidate located outside the coding block and at a location on which coding or decoding has already been performed, from among two spatial merging candidate blocks (e.g., an A1 block 1200 and the B1 block 1220), can be set as the reference picture index of a temporal merging candidate for a second prediction block 1210.

FIG. 12(B) shows a case where a coding block is partitioned into prediction blocks having a 2N×N size.

If one coding block is partitioned into prediction blocks having a 2N×N form, the reference picture index of an A1 block 1240, that is, a spatial merging candidate outside the coding block, from among two spatial merging candidate blocks (e.g., the A1 block 1240 and a B1 block 1260), can be set as the reference picture index of a temporal merging candidate for a second prediction block 1250.

Figure 13:
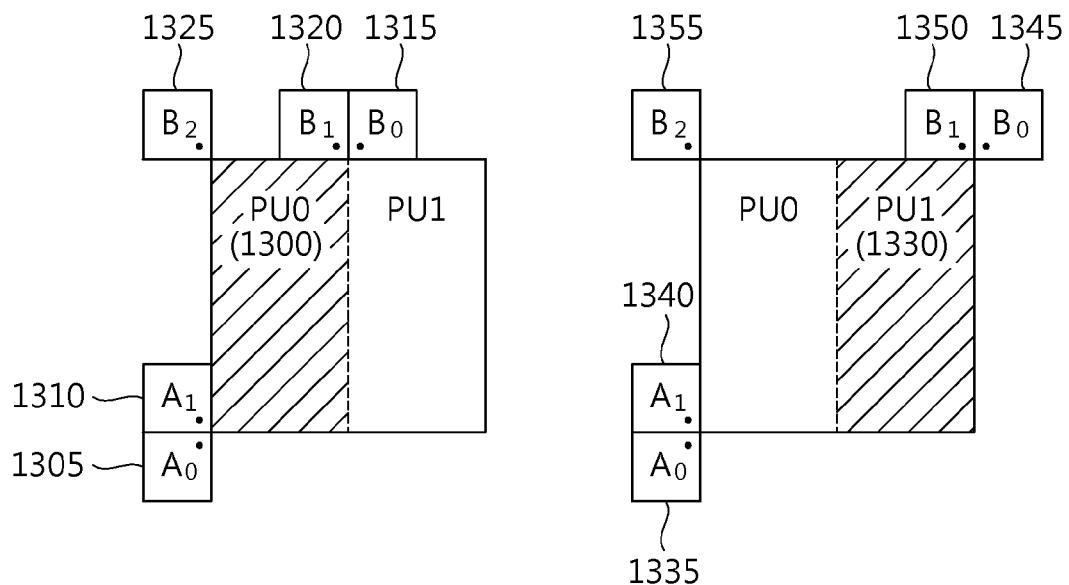
FIG. 13 is a conceptual diagram illustrating a method of deriving the reference picture index of a temporal merging candidate in accordance with an embodiment of the present invention.
Figure 13:
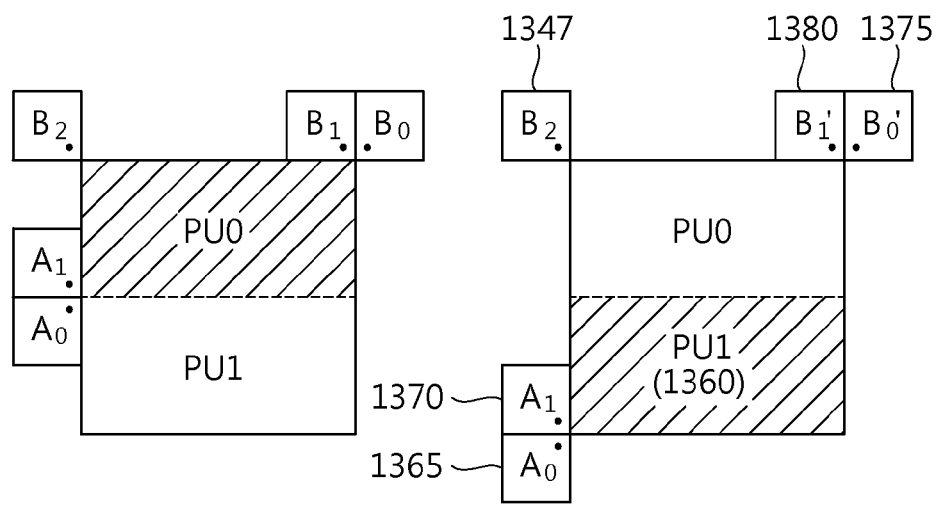

FIG. 13 is a conceptual diagram illustrating a method of deriving the reference picture index of a temporal merging candidate in accordance with an embodiment of the present invention.

The embodiment of FIG. 13 discloses a method of, if the locations of some of the spatial merging candidates of a prediction block are within a coding block or placed at locations on which coding has not yet been performed, fixing the locations of the spatial merging candidate blocks of the corresponding prediction block to locations outside the coding block and using the fixed locations.

FIG. 13(A) shows a case where one coding block is partitioned into two prediction blocks having an N×2N form.

A first prediction block 1300 can determine spatial merging candidate blocks 1305, 1310, 1315, 1320, and 1325 on the basis of the first prediction block 1300. In contrast, a second prediction block 1330 can fix spatial merging candidate blocks to blocks 1335, 1340, 1345, 1350, and 1355 placed at locations outside the coding block and use the fixed spatial merging candidate blocks. That is, the spatial merging candidate blocks 1335, 1340, 1345, 1350, and 1355 can be derived on the basis of the coding block, and the derived spatial merging candidate blocks 1335, 1340, 1345, 1350, and 1355 can be used in inter-frame prediction using merge mode for the second prediction block 1330.

FIG. 13(B) shows a case where one coding block is partitioned into two prediction blocks having a 2N×N form.

Likewise, in FIG. 13(B), a first prediction block can use spatial merging candidate blocks derived on the basis of a prediction block. In contrast, the spatial merging candidate blocks 1365, 1370, 1375, 1380, and 1385 of a second prediction block 1360 can be derived on the basis of the coding block.

Figure 14:
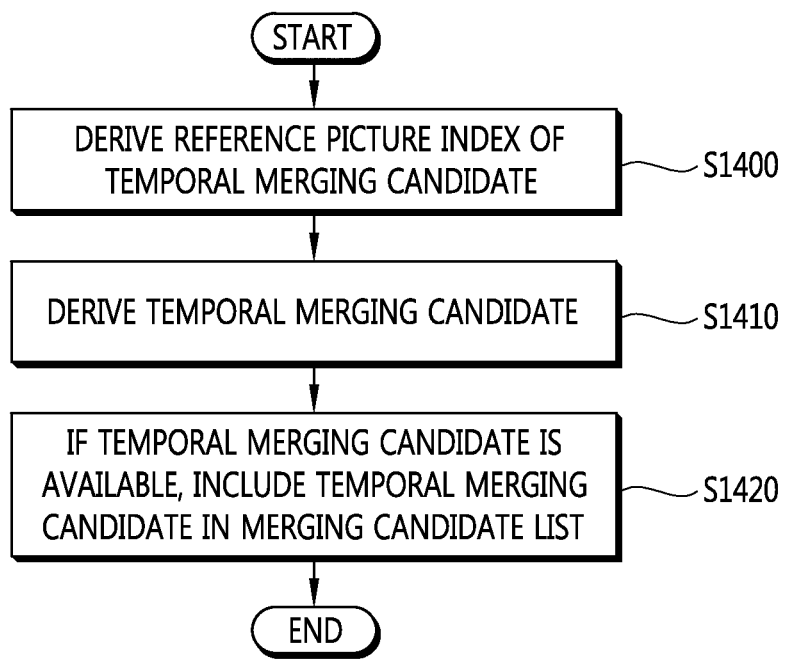
FIG. 14 is a flowchart illustrating a method of including a temporal merging candidate in a merging candidate list in accordance with an embodiment of the present invention.

FIG. 14 is a flowchart illustrating a method of including a temporal merging candidate in a merging candidate list in accordance with an embodiment of the present invention.

The embodiment of FIG. 14 discloses a process of deriving the reference picture index of a temporal merging candidate by using an index value calculated by the above-described method of deriving the reference picture index of a temporal merging candidate and of including the temporal merging candidate in a merging candidate list.

Referring to FIG. 14, the reference picture index of a temporal merging candidate is derived at step S1400.

The reference picture index of the temporal merging candidate refers to the reference picture index of a picture referred by a current block (i.e., a target prediction block) in order to perform inter-frame prediction using merge mode as described above. The reference picture index of the temporal merging candidate can be derived by several methods of deriving the reference picture indices of temporal merging candidates in parallel in relation to a prediction block. For example, the reference picture index of the temporal merging candidate can be derived by several methods, such as 1) a method of always placing the spatial location of a spatial merging candidate block to be referred outside a coding block, 2) a method of replacing a reference picture index value, derived from a spatial merging candidate block to be referred, with '0' if the spatial location of the spatial merging candidate block is within a coding block, and 3) a method of fixing the reference picture index of a temporal merging candidate to '0' unconditionally.

A temporal merging candidate is derived at step S1410.

As described above, the temporal merging candidate can be motion prediction-related information (e.g., predFlag or mvLXCol) derived from a prediction block (e.g., a first temporal merging candidate block) which includes a pixel at a location (xP+nPbW, yP+nPbH) in the colocated picture of a current block on the basis of the location (xP, yP) of a pixel within a picture including the prediction block. If the prediction block including the pixel at the location (xP+nPbW, yP+nPbH) in the colocated picture is not available or is a block predicted by an intra-frame prediction method, motion prediction-related information (e.g., a temporal merging candidate) can be derived from a prediction block (e.g., a second temporal merging candidate block) including a pixel at a location (xP+(nPbW>>1), yP+(nPbH>>1)).

Finally, a final temporal merging candidate block (i.e., a colocated block) used to derive the motion prediction-related information can be a block at a location that has been partially moved on the basis of the locations of the first temporal merging candidate block and the second temporal merging candidate block. For example, if only pieces of motion prediction-related information on some blocks are stored in memory, a temporal merging candidate block present at a location partially moved on the basis of the locations of the first temporal merging candidate block and the second temporal merging candidate block can be determined as the final colocated block for deriving the temporal merging candidate (i.e., motion prediction-related information).

In deriving the temporal merging candidate, different temporal merging candidates can be derived depending on whether a current block is a block using a single merging candidate list or a block not using a single merging candidate list. If the current block is a block using a single merging candidate list, a plurality of prediction blocks included in a coding block can use temporal merging candidates derived from one temporal merging candidate block. If the current block is a block not using a single merging candidate list, a merging candidate list for a plurality of prediction blocks included in a coding block can be generated and inter-frame prediction using merge mode can be performed individually. That is, in this case, the inter-frame prediction can be performed by using temporal merging candidates derived from the temporal merging candidate block for each prediction block. An example in which inter-frame prediction is performed by using a single merging candidate list is described below.

Figure 15:
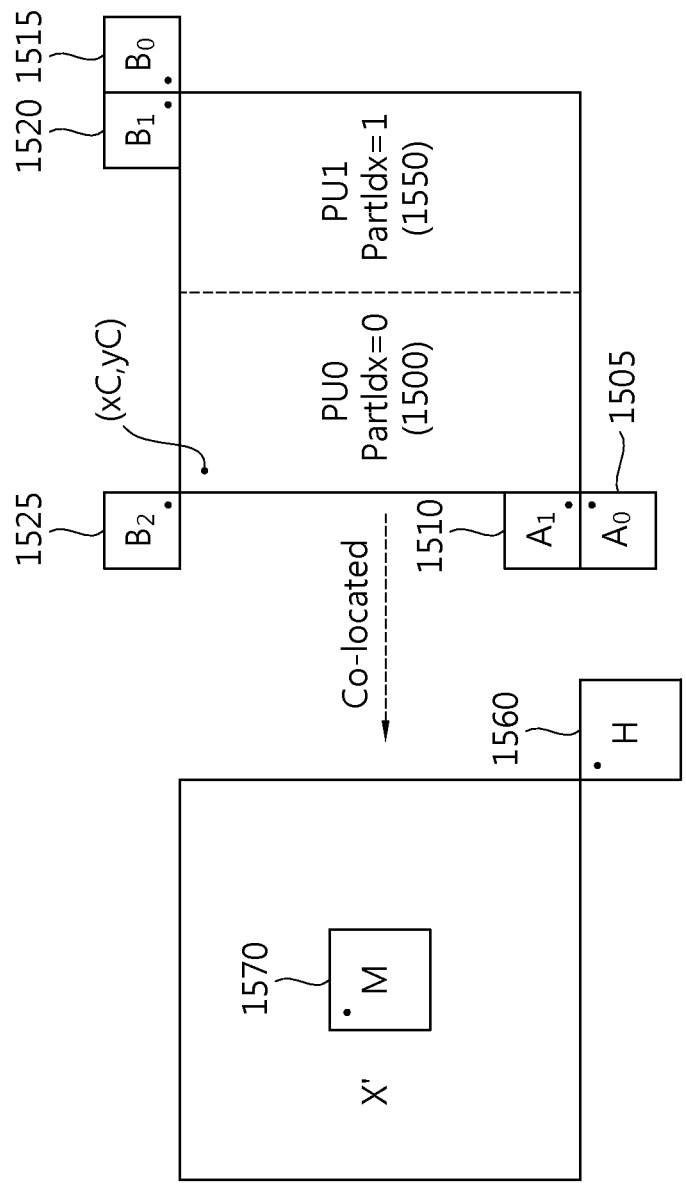
FIG. 15 is a conceptual diagram illustrating a method of generating a single merging candidate list by sharing all spatial merging candidates and temporal merging candidates in a plurality of prediction blocks in accordance with an embodiment of the present invention.

FIG. 15 is a conceptual diagram illustrating a method of generating a single merging candidate list by sharing all spatial merging candidates and temporal merging candidates in a plurality of prediction blocks in accordance with an embodiment of the present invention.

The embodiment of FIG. 15 discloses a method of a plurality of prediction blocks, partitioned from one coding block, generating a single merging candidate list by sharing all spatial merging candidates and temporal merging candidates determined based on the coding block.

Referring to FIG. 15, a first prediction block 1500 and a second prediction block 1550 can derive spatial merging candidates from the same spatial merging candidate block and share the derived spatial merging candidates. Spatial merging candidate blocks for the first prediction block 1500 and the second prediction block 1550 are blocks determined based on a coding block, and an A0 block 1505, an A1 block 1510, a B0 block 1515, a B1 block 1520, and a B2 block 1525 can be used as the spatial merging candidate blocks.

The location of each of the spatial merging candidate blocks can be a location including a pixel shown in the drawing on the basis of the upper left location (xC, yC) and nCS (i.e., the size of the coding block) of the coding block.

The A0 block 1505 can be a block including a pixel at a location (xC−1, yC+nCS), the A1 block 1510 can be a block including a pixel at a location (xC−1, yC+nCS−1), the B0 block 1515 can be a block including a pixel at a location (xC+nCS, yC−1), the B1 block 1520 can be a block including a pixel at a location (xC+nCS−1, yC−1), and the B2 block 1525 can be a block including a pixel at a location (xC−1, yC−1).

Furthermore, the first prediction block 1500 and the second prediction block 1550 can share temporal merging candidates. Temporal merging candidate blocks 1560 and 1570 for deriving the temporal merging candidates shared by the first prediction block 1500 and the second prediction block 1550 can be blocks at locations derived on the basis of the upper left locations (xC, yC) of the coding block and the size nCS of the coding block.

The reference picture indices of the temporal merging candidates can be derived by the aforementioned methods.

For example, the temporal merging candidate blocks 1560 and 1570 can include the prediction block 1560 including a pixel at a location (xC+nCS, yC+nCS) in the colocated picture of a current prediction block on the basis of the pixel location (xC, yC) within the picture including the prediction block or can be the prediction block 1570 including a pixel at a location (xC+(nCS>>1), yC+(nCS>>1)) if the prediction block including the pixel at the location (xC+nCS, yC+nCS) is not available.

If temporal merging candidates are not shared, each of the temporal merging candidates for the first prediction block 1500 and the second prediction block 1550 can be derived.

If a method of deriving a single merging candidate list is used, inter-frame prediction can be performed by parallel merging processing performed on each prediction block, and a merging candidate list for each prediction block does not need to be derived separately. Accordingly, by using a single merging candidate list in accordance with an embodiment of the present invention, an image processing speed can be improved in apparatuses, such as Ultra-High Definition TeleVision (UHDTV) that requires a large amount of data processing.

FIG. 15 discloses only the first N×2N prediction block 1500 and the second N×2N prediction block 1550 each partitioned in an N×2N form, but this method can also be applied to prediction blocks partitioned in various forms, such as blocks having different partition forms (e.g., 2N×N, 2N×nU, 2N×nD, nL×2N, nR×2N, and N×N).

Furthermore, in this method, whether or not to apply a single merging candidate list can be differently determined depending on the size of a block or a partition depth. For example, information on whether a single merging candidate list can be used in a specific block or not can be derived on the basis of pieces of information on the size of a block and the size of a coding block on which a merging process can be performed in parallel. For example, information on whether a single merging candidate list can be used in a specific block or not can be represented by flag information. A flag indicating whether or not a single merging candidate list can be used in a specific block can be defined as singleMCLflag (i.e., a single merge candidate list flag). For example, if the single merge candidate list flag singleMCL-flag is 0, it can indicate that a block does not use a single merging candidate list. If the single merge candidate list flag singleMCLflag is 1, it can indicate that a block uses a single merging candidate list. Spatial merging candidates for a prediction block can be derived on the basis of a coding block based on a value of the single merge candidate list flag singleMCLflag.

For example, the size of a block on which a merging process can be performed in parallel can derive flag information indicating that a prediction block, partitioned from an 8×8 coding block on the basis of information indicative of a value greater than a 4×4 size and information indicating that the size of a current block is 8×8, uses a single merging candidate list. The derived flag can be used to derive the spatial merging candidates and temporal merging candidates of a prediction block on the basis of a coding block.

Referring back to FIG. 14, availability information on the temporal merging candidate and a temporal motion vector can be derived on the basis of information on the reference picture index of the temporal merging candidate derived to derive the temporal merging candidate at the step S1410.

The availability information on the temporal merging candidate can be used as information indicating whether the temporal merging candidate can be derived on the basis of a temporal merging candidate block. The temporal motion vector can be derived if the temporal merging candidate is available.

Referring back to FIG. 4, the temporal motion vector mvLXCol can be scaled and derived on the basis of the distance between two pictures derived based on the index of the picture 430 including a temporal merging candidate and the index of the reference picture 440 referred by the colocated picture 410 and the distance between pictures derived based on the index of the colocated picture 410 including the current block 400 and the index of the reference picture of a temporal merging candidate (i.e., the index of the reference picture 460 referred by the current block 400 in inter-frame prediction).

If the temporal merging candidate is available, the temporal merging candidate is included in a merging candidate list at step S1420.

When configuring the merging candidate list, if the temporal merging candidate is available based on availability information on the temporal merging candidate derived at the step S1410, a corresponding block can be included in the merging candidate list.

Figure 16:
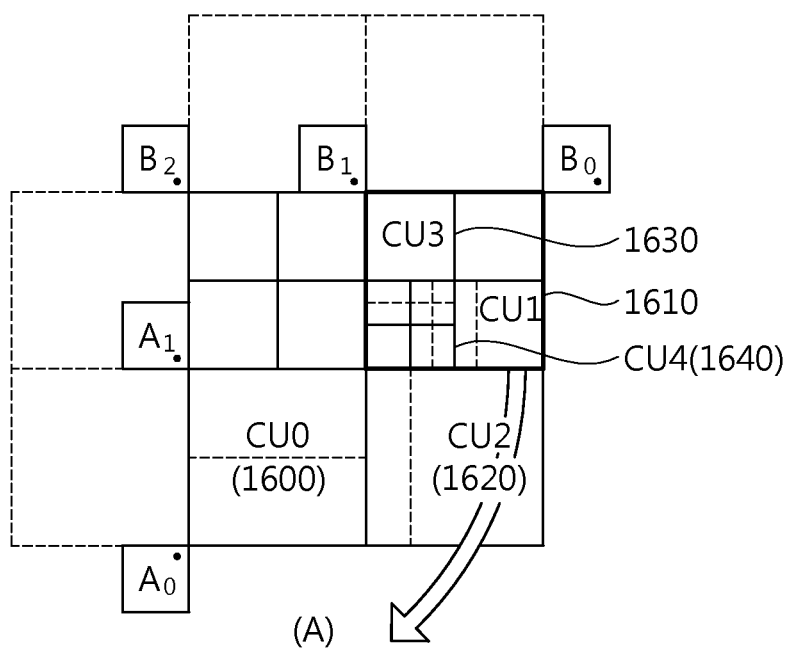
FIG. 16 is a conceptual diagram illustrating a method of generating a single candidate list in accordance with an embodiment of the present invention.
Figure 16:
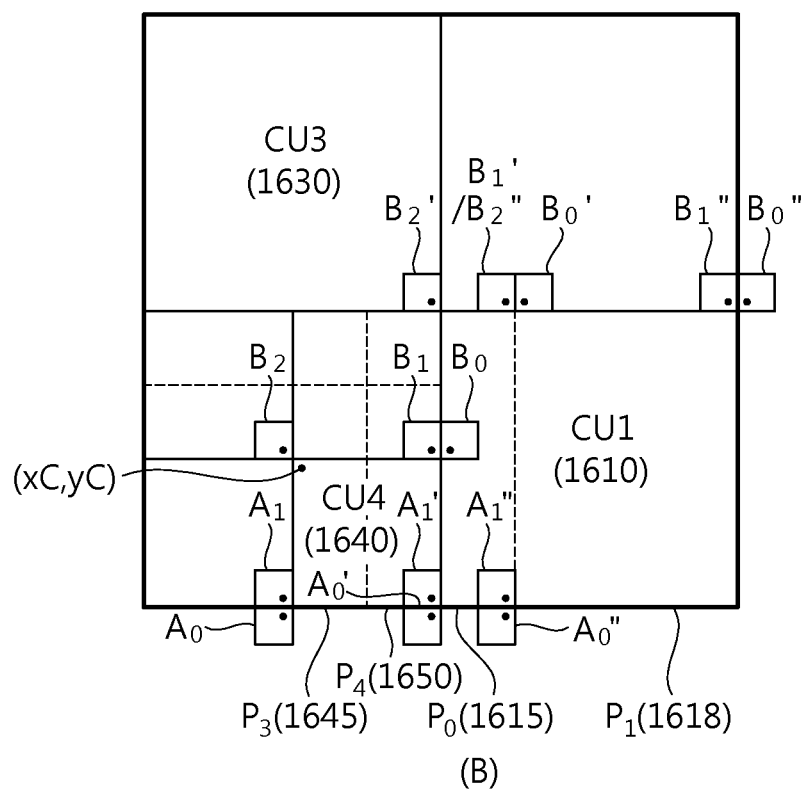

FIG. 16 discloses a method in which prediction blocks within the same coding block share spatial merging candidates and temporal merging candidates only when the size of a block is equal to or smaller than a specific size.

FIG. 16 is a conceptual diagram illustrating a method of generating a single candidate list in accordance with an embodiment of the present invention.

The embodiment of FIG. 16 discloses a method in which prediction blocks within the same coding block share spatial merging candidates and temporal merging candidates when the size of the coding block is equal to or smaller than a specific size in inter-frame prediction using merge mode.

Several pieces of information can be used to use a method of sharing a single merging candidate list only in blocks that satisfy a specific condition. For example, information on whether a current block uses a single merging candidate list or not can be derived based on information on the size of a block on which parallel merging processing can be performed and information on the size of a current coding block. Spatial merging candidates and temporal merging candidates for a prediction block can be derived on the basis of a coding block that satisfies the specific condition based on the pieces of derived information.

Referring to FIG. 16(A), only when conditions that the size of a block on which parallel merging processing can be performed is 8×8 or greater and the size of a coding block is 8×8 are satisfied, for example, prediction blocks partitioned from the coding block can share a single merging candidate list.

It is assumed that a first coding block CU0 1600 has a size of 32×32, a second coding block CU1 1610 has a size of 16×16, a third coding block CU2 1620 has a size of 32×32, a fourth coding block CU3 1630 has a size of 16×16, and a fifth coding block CU4 1640 has a size of 8×8.

FIG. 16(B) is a conceptual diagram only showing spatial merging candidate blocks for some coding blocks.

Referring to FIG. 16(B), the second coding block 1610 can be partitioned into two prediction blocks 1615 and 1618 having an nL×2N form, and the fifth coding block 1640 can be partitioned into two prediction blocks 1645 and 1650 having an N×2N form. In FIG. 16(B), it is assumed that a single merging candidate list for only the coding block 1640 having the 8×8 size is generated.

Each of the first prediction block 1615 and the second prediction block 1618 of the second coding block 1610 can derive spatial merging candidates for each prediction block and generate a merging candidate list for each prediction block based on the derived spatial merging candidates.

The size of the fifth coding block 1640 is 8×8, and the fifth coding block 1640 can satisfy conditions of the size of a block on which parallel merging processing can be performed and conditions of the size of a current coding block. In this case, the third prediction block 1645 included in the fifth coding block 1640 and the fourth prediction block 1650 can generate a single merging candidate list based on the spatial merging candidates and the temporal merging candidates derived on the basis of the location and size of a coding block. Accordingly, the reference picture index of a temporal merging candidate can be derived as one value.

The reference picture index of the temporal merging candidate can be derived by the aforementioned methods.

The above-described image coding and image decoding methods can be implemented in the elements of the image coder and the image decoder described with reference to FIGS. 1 and 2.

Although the present invention has been described, a person having ordinary skill in the art will appreciate that the present invention may be modified and changed in various manners without departing from the spirit and scope of the present invention which are written in the claims below.

What is claimed is:

1. An image decoder comprising:
one or more processors configured to
select a collocated picture, the collocated picture having a different temporal order from a current picture that includes a current prediction block, and the collocated picture comprising a temporal neighboring block which is used to derive a temporal merging candidate of the current prediction block,
derive a spatial merging candidate by using a spatial neighboring block,
derive the temporal merging candidate by using the temporal neighboring block,
generate a merging candidate list including the spatial merging candidate and the temporal merging candidate,
determine a motion vector and a reference picture index of the current prediction block by using the merging candidate list, the reference picture index of the current prediction block specifying a reference picture of the current prediction block, wherein the reference picture of the current prediction block has a different temporal order from the current picture and the collocated picture,
obtain prediction samples of the current prediction block by using reconstruction samples within the reference picture specified by the reference picture index of the current prediction block, the reconstruction samples being indicated by the motion vector of the current prediction block,
obtain residual samples of a current transform block by performing inverse-quantization and inverse-transform, and generate a reconstruct block by adding the prediction samples and the residual samples, wherein while a reference picture index of the spatial merging candidate is determined based on a reference picture of the spatial neighboring block, a reference picture index of the temporal merging candidate is set to a fixed value of zero, the reference picture index of the temporal merging candidate being used to determine the reference picture index of the current prediction block, but not used to determine the collocated picture of the current prediction block, and wherein the spatial neighboring block and the temporal neighboring block are determined based on: a position of a coding block, a size of a block on which a parallel merge processing is applicable, and a size of the coding block, wherein the coding block includes the current prediction block.

2. The method of claim 1, wherein the temporal neighboring block is representative one of a first block and a second block in the collocated picture, the first block being located at a position corresponding to a bottom right position of the current prediction block or the coding block, and the second block being located at a position corresponding to a central position of the current prediction block or the coding block.

3. The method of claim 1, wherein a temporal motion vector of the temporal merging candidate is derived by scaling a motion vector of the temporal neighboring block, based on both a first picture distance and a second picture distance, wherein the first picture distance is defined as a temporal order difference between the collocated picture and a reference picture of the temporal neighboring block, and wherein the second picture distance is defined as a temporal order difference between the current picture and a reference picture specified by the reference picture index of the temporal merging candidate.

4. A method of decoding a video signal, comprising:

selecting a collocated picture, the collocated picture having a different temporal order from a current picture that includes a current prediction block, and the collocated picture comprising a temporal neighboring block which is used to derive a temporal merging candidate of the current prediction block;

deriving a spatial merging candidate by using a spatial neighboring block;

deriving the temporal merging candidate by using the temporal neighboring block;

generating a merging candidate list including the spatial merging candidate and the temporal merging candidate;

determining a motion vector and a reference picture index of the current prediction block by using the merging candidate list, the reference picture index of the current prediction block specifying a reference picture of the current prediction block, wherein the reference picture of the current prediction block has a different temporal order from the current picture and the collocated picture; and obtaining prediction samples of the current prediction block by using reconstruction samples within the reference picture specified by the reference picture index of the current prediction block, the reconstruction samples being indicated by the motion vector of the current prediction block;

obtaining residual samples of a current transform block by performing inverse-quantization and inverse-transform; and generating a reconstruct block by adding the prediction samples and the residual samples, wherein while a reference picture index of the spatial merging candidate is determined based on a reference picture of the spatial neighboring block, a reference picture index of the temporal merging candidate is set to a fixed value of zero, the reference picture index of the temporal merging candidate being used to determine the reference picture index of the current prediction block, but not used to determine the collocated picture of the current prediction block, and wherein the spatial neighboring block and the temporal neighboring block are determined based on: a position of a coding block, a size of a block on which a parallel merge processing is applicable, and a size of the coding block, wherein the coding block includes the current prediction block.

5. The method of claim 4, wherein the temporal neighboring block is representative one of a first block or a second block in the collocated picture, the first block including a position corresponding to a bottom right position of the current prediction block or the coding block, and the second block including a position corresponding to a central position of the current prediction block or the coding block.

6. An image encoder comprising:

one or more processors configured to select a collocated picture, the collocated picture having a different temporal order from a current picture that includes a current prediction block, and the collocated picture comprising a temporal neighboring block which is used to derive a temporal merging candidate of the current prediction block, derive a spatial merging candidate by using a spatial neighboring block, derive the temporal merging candidate by using the temporal neighboring block, generate a merging candidate list including the spatial merging candidate and the temporal merging candidate, determine a motion vector and a reference picture index of the current prediction block by using the merging candidate list, the reference picture index of the current prediction block specifying a reference picture of the current prediction block, wherein the reference picture of the current prediction block has a different temporal order from the current picture and the collocated picture, obtain prediction samples of the current prediction block by using reconstruction samples within the reference picture specified by the reference picture index of the current prediction block, the reconstruction samples being indicated by the motion vector of the current prediction block, obtain residual samples of a current transform block by performing inverse-quantization and inverse-transform, and generate a reconstruct block by adding the prediction samples and the residual samples, wherein while a reference picture index of the spatial merging candidate is determined based on a reference picture of the spatial neighboring block, a reference picture index of the temporal merging candidate is set to a fixed value of zero, the reference picture index of the temporal merging candidate being used to determine the reference picture index of the current prediction block, but not used to determine the collocated picture of the current prediction block, and wherein the spatial neighboring block and the temporal neighboring block are determined based on: a position of a coding block, a size of a block on which a parallel merge processing is applicable, and a size of the coding block, wherein the coding block includes the current prediction block.

7. A recording medium storing a bitstream formed by an image encoder, the encoder comprising:

one or more processors configured to select a collocated picture, the collocated picture having a different temporal order from a current picture that includes a current prediction block, and the collocated picture comprising a temporal neighboring block which is used to derive a temporal merging candidate of the current prediction block, derive a spatial merging candidate by using a spatial neighboring block, derive the temporal merging candidate by using the temporal neighboring block, generate a merging candidate list including the spatial merging candidate and the temporal merging candidate, determine a motion vector and a reference picture index of the current prediction block by using the merging candidate list, the reference picture index of the current prediction block specifying a reference picture of the current prediction block, wherein the reference picture of the current prediction block has a different temporal order from the current picture and the collocated picture, obtain prediction samples of the current prediction block by using reconstruction samples within the reference picture specified by the reference picture index of the current prediction block, the reconstruction samples being indicated by the motion vector of the current prediction block, obtain residual samples of a current transform block by performing inverse-quantization and inverse-transform, and generate a reconstruct block by adding the prediction samples and the residual samples, wherein while a reference picture index of the spatial merging candidate is determined based on a reference picture of the spatial neighboring block, a reference picture index of the temporal merging candidate is set to a fixed value of zero, the reference picture index of the temporal merging candidate being used to determine the reference picture index of the current prediction block, but not used to determine the collocated picture of the current prediction block, and wherein the spatial neighboring block and the temporal neighboring block are determined based on: a position of a coding block, a size of a block on which a parallel merge processing is applicable, and a size of the coding block, wherein the coding block includes the current prediction block.

* * * * *